United States Patent
Wang et al.

(10) Patent No.: US 12,449,592 B2
(45) Date of Patent: Oct. 21, 2025

(54) POLARIZATION-MAINTAINING DISPERSION-COMPENSATION MICROSTRUCTURE FIBER

(71) Applicant: YANSHAN UNIVERSITY, Qinhuangdao (CN)

(72) Inventors: Wei Wang, Qinhuangdao (CN); Man Yang, Qinhuangdao (CN); Chang Zhao, Qinhuangdao (CN); Xiaochen Kang, Qinhuangdao (CN); Hongda Yang, Qinhuangdao (CN); Wenchao Li, Qinhuangdao (CN)

(73) Assignee: YANSHAN UNIVERSITY, Qinhuangdao (CN)

( * ) Notice: Subject to any disclaimer, the term of this patent is extended or adjusted under 35 U.S.C. 154(b) by 382 days.

(21) Appl. No.: 18/172,256

(22) Filed: Feb. 21, 2023

(65) Prior Publication Data
US 2023/0204855 A1    Jun. 29, 2023

Related U.S. Application Data

(63) Continuation of application No. PCT/CN2022/092253, filed on May 11, 2022.

(30) Foreign Application Priority Data

Jul. 7, 2021   (CN) .......................... 202110769340.0

(51) Int. Cl.
*G02B 6/02*    (2006.01)
*G02B 6/024*   (2006.01)
*G02B 6/036*   (2006.01)

(52) U.S. Cl.
CPC ......... *G02B 6/024* (2013.01); *G02B 6/02042* (2013.01); *G02B 6/02261* (2013.01);
(Continued)

(58) Field of Classification Search
CPC ............ G02B 6/02042; G02B 6/02261; G02B 6/02285; G02B 6/02319; G02B 6/02342;
(Continued)

(56) References Cited

U.S. PATENT DOCUMENTS

| | | | |
|---|---|---|---|
| 6,917,741 B2 * | 7/2005 | Fekety | G02B 6/02338 65/393 |
| 7,356,233 B2 * | 4/2008 | Fini | G02B 6/02328 385/127 |

(Continued)

FOREIGN PATENT DOCUMENTS

| | | |
|---|---|---|
| CN | 101923187 A | 12/2010 |
| CN | 102540324 A | 7/2012 |

(Continued)

OTHER PUBLICATIONS

Internation Search Report of PCT/CN2022/092253, Mailed Jul. 21, 2022.

*Primary Examiner* — Ryan A Lepisto
(74) *Attorney, Agent, or Firm* — True Shepherd LLC; Andrew C. Cheng

(57) ABSTRACT

A polarization-maintaining dispersion-compensation microstructure fiber includes an inner core, an air-hole array in area 1 and an air-hole array in area 2. The air holes in the area 1 and 2 air-hole arrays are arranged in square lattice. The air-hole arrays in areas 1 and 2 are dislocated by half-layer along y-direction. In area 1, 2 air holes in the middle row are omitted to form a solid area as the inner core. 2 outer cores are located in 2 sub-areas of area 2, and each outer core contains 2 air holes. The long (or short) axes of the inner and outer cores are perpendicular, and the center points of the inner core and the two outer cores are located on the x-axis.

7 Claims, 12 Drawing Sheets

(52) U.S. Cl.
CPC ..... *G02B 6/02285* (2013.01); *G02B 6/02319* (2013.01); *G02B 6/02342* (2013.01); *G02B 6/02357* (2013.01); *G02B 6/02366* (2013.01); *G02B 6/036* (2013.01)

(58) Field of Classification Search
CPC ................ G02B 6/02357; G02B 6/02366; G02B 6/024; G02B 6/036
See application file for complete search history.

(56) References Cited

U.S. PATENT DOCUMENTS

| | | | |
|---|---|---|---|
| 7,782,910 B2 | 8/2010 | Fermann et al. | |
| 8,564,877 B2* | 10/2013 | Goto ................. | G02B 6/02347 359/341.1 |
| 8,958,676 B2* | 2/2015 | Geernaert .......... | G01D 5/35316 385/125 |
| 9,158,065 B2* | 10/2015 | Fini .................... | G02B 6/02357 |
| 9,476,699 B2 | 10/2016 | Yao | |
| 9,689,666 B2 | 6/2017 | Yao et al. | |
| 10,261,245 B2* | 4/2019 | Sulejmani .......... | G02B 6/02109 |
| 11,391,886 B2* | 7/2022 | Chenard ............. | C03B 37/0279 |
| 11,598,915 B2* | 3/2023 | Zhang ................ | G02B 6/02338 |
| 12,111,491 B2* | 10/2024 | Wang ................. | G02B 6/02342 |
| 2008/0050077 A1 | 2/2008 | Kinoshita et al. | |
| 2014/0270666 A1* | 9/2014 | Fini .................... | G02B 6/02352 385/123 |

FOREIGN PATENT DOCUMENTS

| | | |
|---|---|---|
| CN | 110501776 A | 11/2019 |
| CN | 113589424 A | 11/2021 |
| WO | 2010107138 A1 | 9/2010 |

* cited by examiner (a)

(b)

(a)

(b)

(a)

(b)

POLARIZATION-MAINTAINING DISPERSION-COMPENSATION MICROSTRUCTURE FIBER

CROSS-REFERENCE TO RELATED APPLICATIONS

This application is a continuation of International Patent Application No. PCT/CN2022/092253 with a filing date of May 11, 2022, designating the United States, now pending, and further claims priority to Chinese Patent Application No. 202110769340.0 with a filing date of Jul. 7, 2021. The content of the aforementioned applications, including any intervening amendments thereto, are incorporated herein by reference.

TECHNICAL FIELD

This invention relates to the field of optical fiber communication, in particular to a polarization-maintaining dispersion-compensation microstructure fiber.

BACKGROUND OF THE PRESENT INVENTION

Fiber is one of the excellent media for optical signal transmission. The polarization-maintaining dispersion-compensation fiber can not only reduce the bit error rate, but also improve the signal transmission quality. It has broad application prospects.

The flexibility of microstructure fiber (MSF)'s structural design provides a large space for realizing polarization-maintaining property and dispersion-compensation property. When the MSF is used to achieve polarization-maintaining property (or high birefringence property), if the overall structure of the MSF has C2v symmetry, the x and y polarization states of the same mode in the core will no longer degenerate (the real parts of the refractive indices of x and y-polarized modes are no longer equal), resulting in birefringence. If the air holes are in a square-arranged array whose symmetry is C4v, the core modes of the MSF with C4v symmetry do not have birefringence. Therefore, a rectangular core can be formed by omitting several adjacent air holes in the array of square-arranged air holes to reduce the overall symmetry of the fiber to C2v symmetry. For example, Ming-Yang Chen proposed a square lattice photonic crystal fiber: the core is birefringent by omitting the two air holes in the center in the y-direction, so that it has C2v symmetry. It should be noted that all air holes are arranged in square lattice with C4v symmetry, so from the perspective of the corresponding direction (x or y-direction) of the two perpendicular sides of the square lattice, the geometric structure is completely equivalent. Omitting x or the y-direction air holes to form the core has no differences. At the same time, as a polarization-maintaining fiber, this fiber should transmit light with low loss in both x and y-directions. Therefore, the cladding air holes have the technical effect of effectively confining the energy of the x and y-polarized modes in the core to make sure the energy in the core hardly leaks to the outside of the fiber through the cladding air holes.(Ming-Yang Chen et al., Broadband single-polarization operation in square-lattice photonic crystal fibers, [J]. Journal of Lightwave Technology, 2010, 28(9/12): 1443-1446.)

In the same paper and the corresponding invention patent, based on the above structure, Ming-Yang Chen et al. further constructed a cladding defect in the cladding. It has the same configuration as the core, and the arrangement direction is perpendicular to the core (omit two adjacent air holes in the x-direction). A broadband single-polarization square lattice photonic crystal fiber is proposed. The key points of this scheme are: use the rectangular core to generate birefringence in the core. Two cladding rectangular defects are constructed, with their arrangement direction (long and short side directions) perpendicular to the rectangular core. The above results in cladding defects and inner core whose fast and slow axis are in opposite direction. To further change the diameter of the air holes surrounding the core: when it is smaller (larger) than the diameter of the air hole surrounding the cladding defect, the effective mode refractive indices of the x-polarized mode (y-polarized mode) in the core and cladding defects are matched. Hence, the x-polarized mode (y-polarized mode) in the core and cladding defects are strongly coupled and the polarized mode in the core is effectively attenuated. Moreover, the polarized modes of the other perpendicular direction in the core and cladding defects have a large refractive index difference, which will reduce the mutual coupling and ensure the low loss transmission of the polarized mode in the core. As a result, the technical effect of single-mode single-polarization transmission is realized. It should be noted that, to realize the technical effect of broadband single-polarization, the core mode without coupling is the useful mode and is retained; the core mode that couples with the defect mode is the one that to be filtered. In order to efficiently filter out this mode, the technical scheme is as follows: the effective refractive index curves of the inner core and defect polarized mode that need to be coupled are similar in slope, shape and size, so that the two polarized modes that need to be matched are easier to achieve broadband matching. (Ming-Yang Chen et al. Broadband single-polarization operation in square-lattice photonic crystal fibers, [J]. Journal of Lightwave Technology, 2010, 28(9/12): 1443-1446. and Ming-Yang Chen, Yong-Kang Zhang et al., A Single-polarization photonic crystal fiber: China, CN201010149977.1, [P]. 2010-12-22.)

To use MSF to achieve dispersion compensation property (or large negative dispersion property), from the perspective of fiber structure, a common technical scheme is concentric double core MSF. In this scheme, the inner core is formed by omitting the air hole in the center, and the outer ring core is formed by reducing air holes in a certain layer of the cladding. The geometries of the inner and outer cores of the fiber are quite different, so the relations between mode refractive index and wavelength (i.e., the slope of curves of the mode refractive index with wavelength) are quite different in the two cores. According to the coupled mode theory, the closer the refractive indices of the modes are, the stronger the mode couple between them is. Under the premise that the difference of the slope value between the curves of refractive index with wavelength is large for the inner and outer core mode, the refractive indices of the inner and outer core mode can be adjusted to make them intersect at a certain wavelength, but quickly separate at other wavelengths. This leads to strong coupling near the intersection point and weak coupling at other wavelengths, which further results in a sudden change of the refractive indices of the inner and outer core mode only around the intersection point. This sudden change of the refractive indices means sudden change on the curve of refractive index with wavelength at the intersection point, which results in a large negative dispersion to make it have dispersion compensation property. For example, Maji Partha Sona et al. designed a super-negative dispersion photonic crystal fiber with square lattice geometry. Their technical scheme can be briefed as follows: the air hole in the center of the fiber is omitted to form the inner core. The diameter of all air holes in the third ring is reduced to form the outer core. The modes of the inner and outer core are coupled to result in a large negative dispersion near 1550 nm. (Maji Partha Sona et al., Designing an Ultra-Negative Dispersion Photonic Crystal Fiber with Square-Lattice Geometry, [J]. International Scholarly Research Notices, 2014, 2014.) In addition, Wang Honghua et al. designed an improved square lattice double-core photonic crystal fiber. The difference between Wang Honghua et al.'s and Maji Partha Sona et al.'s scheme is that the second layer of Wang Honghua et al.'s uses two kinds of air holes with different diameters. The larger holes are located at the 4 vertices. The other air holes with smaller diameters are used as the outer core (Wang Honghua et al., Analysis of Negative Dispersion Property of Improved Square Lattice Duplex Photonic Crystal Fiber, [J]. Chinese Journal of Quantum Optics, 2009,15(4):368-373.).

There are mainly two types of technical schemes for realizing polarization-maintaining dispersion-compensation property. The first type combines the C2v symmetry structure and the concentric double core structure. By the low symmetry and mode coupling effect of C2v, birefringence is generated between the x and y polarization states of the inner core. One or two groups of the same polarized modes in the inner and outer core couple at certain wavelengths, while they do not couple at other wavelengths. Hence, the polarized mode of the inner core has both polarization-maintaining and dispersion-compensation properties around the coupling point. For example, Wang Wei and Yang Qihao et al. proposed a technical scheme of polarization-maintaining dispersion-compensation MSF. The elliptical air holes in the inner cladding, the outer core and the outer cladding are arranged in an isosceles triangle lattice. By a variety of mechanisms with the same or opposite effect to adjust the mode refractive indices, the inner and outer core has the same birefringence direction (i.e., the same fast and slow axis direction). The birefringence values of the inner and outer core are further matched. This makes the inner core has the polarization-maintaining property, and both polarized directions of the inner core have the dispersion-compensation property. (Wang Wei, Yang Qihao, et al., A polarization-maintaining dispersion-compensation microstructure fiber, China, CN201911121696.2, [P]. 2020-02-14.) In a technical scheme of a polarization-maintaining dispersion-compensation MSF proposed by Wang Wei and Zhou Fandi et al., the central air hole in the inner core area is filled with liquid crystal to make the fiber polarization maintaining. The air holes in the outer core area are also filled with liquid crystal to make the outer core area birefringent. By adjusting the refractive index of each polarized mode, the refractive index curves of the x-polarized mode (or y-polarized mode) in the inner and outer core area are intersected, if the liquid crystal rotates at 0° (or 90°). This makes the modes in the inner and outer core couple with each other, which further results in a large negative dispersion on the x-polarized mode (or the y-polarized mode) of the inner core area. (Wang Wei, Zhou Fandi, et al., A polarization-maintaining dispersion-compensation microstructure fiber: China, CN201911207733.1, [P]. 2020-03-13.). The second type of scheme also uses C2v symmetry and forms an outer ring core. But it does not mention whether inner and outer core modes are coupled or not. It only explicitly says to control the dispersion property by changing the air-holes' shape, size and spacing. For example, Md. Ibadul Islam et al. proposed a square-lattice photonic crystal fiber with extremely high nonlinearity, high birefringence and ultra-high negative dispersion compensation. In this design, the inner core is formed by omitting the central air hole, the outer core is formed by reducing the diameter of the circular air hole at the third ring, and the rest of the air hole rings consists of elliptical air holes. Although this design also has a concentric double core structure, it only studied how to achieve large negative dispersion by adjusting and optimizing the structural parameters of the photonic crystal fiber. It does not mention if there is couple between inner and outer core modes. (Md. Ibadul Islam et al., Proposed Square Lattice Photonic Crystal Fiber for Extremely High Nonlinearity, Birefringence and Ultra-High Negative Dispersion Compensation, [J]. Journal of Optical Communications,2019, 40(4).)

In addition, it should be noted that, the application fields and technical effects of polarization-maintaining dispersion-compensation fiber and single-mode single-polarization fiber are different. Therefore, these two types of fibers have lots of differences: for polarization-maintaining dispersion-compensation fiber, the polarized mode in the inner core that couples with the polarized mode in the outer core, is used to realize the dispersion compensation property. The slope of curves of refractive index with wavelength for these inner and outer core modes need a large divergence, so that the two modes can be strongly coupled at a certain wavelength and the coupling strength is rapidly weakened at other wavelengths. As a result, the large negative dispersion is achieved at the coupling wavelength and a narrow band region nearby. Besides, since the light energy needs to be transmitted, the energy of this inner core polarized mode should be tightly confined in the inner core by the air holes, in order to guarantee a low loss transmission in the working band. To the other inner core polarized mode that is perpendicular to the inner core polarized mode mentioned above, if it does not couple with the outer core mode, it will not have the large negative dispersion and dispersion compensation properties. To this polarized mode, its main requirement is to ensure the refractive index difference between the two inner core polarized modes large enough, in order to reduce the couple between the two inner core polarized modes and avoid the crosstalk of their energy. There are no other requirements on other properties, such as loss. The energy in this polarized mode can either leak outside through the cladding air holes or be confined in the inner core by the cladding air holes. For a single-mode single-polarization fiber, the inner core polarized mode does not couple to the outer core is used. This requires the mode is tightly confined in the inner core by air holes to achieve low-loss light transmission of this polarized mode in the inner core. For the other polarized mode in the inner core coupled with the mode in the outer core, the wider the coupling bandwidth with the outer core mode, the better the overall performance of the fiber. So, the value and the slopes of curves of refractive index with wavelength are required as close as possible for the two modes. In addition, this polarized inner core mode must be coupled with the corresponding outer core mode, in order to transfer its energy to the outer core then leak it out through the air holes. Therefore, the confinement loss for this mode is required to be as large as possible.

SUMMARY OF PRESENT INVENTION

The purpose of this invention is to provide a kind of MSF that has a large negative dispersion in a certain polarized inner core mode and can also maintain this mode's polarization state during transmission. This invention has the technical effects of maintaining the polarization state of the input light from the front-end polarization-maintaining fiber and compensating its accumulated dispersion. To achieve this goal, the technical scheme provided by this invention has simultaneously solved the following three technical problems:

(1) In terms of the mode refractive index value, large difference (high birefringence) between the mode refractive indices of the two inner core polarized modes has achieved. In addition, the match of refractive indices between the inner core polarized mode that has large negative dispersion and the outer core mode of the same polarization state has achieved.

In this invention, the following technical schemes have been used: a solid area is formed by omitting two consecutive air holes in the middle column of air-hole array in area 1, then a quasi-rectangle inner core is formed by the first layer of air-hole arrays surrounding the solid area. The diameter of air holes in the single-layer air-hole array surrounding the inner core is enlarged. The spacing between adjacent air holes in the air-hole array in area 1 is reduced. The diameter of the air holes in the inner cladding is smaller than the diameter of the air holes in the single-layer air-hole array surrounding the inner core. The diameter of air holes in the single-layer air-hole array surrounding the outer core is enlarged. The spacing between adjacent air holes in the air-hole array in area 2 is reduced. The air-hole array of area 2 has 2 sub-areas that locate at the left and right lateral of the air-hole array of area 1. The air-hole array in area 2 is dislocated by half-layer spacing along y-direction relative to the air-hole array in area 1. All of the technical schemes above change the refractive index value of x-polarized mode (inner-neff-x) and y-polarized mode (inner-neff-y) of the inner core. Their combined actions make the inner-neff-x smaller than the inner-neff-y. In conclusion, under the combined effects of the above technical schemes, this invention has controlled the inner-neff-x and inner-neff-y values, and has generated high birefringence with the fast axis along x-direction and the slow axis along y-direction in the inner core of the fiber.

In this invention, the following technical schemes have been used: a rectangular outer core with long side along x-direction is formed. The diameter of the air holes in the single-layer air-hole array surrounding the outer core is enlarged. The spacing between adjacent air holes in the air-hole array in area 2 is reduced. Two x-direction air holes in the outer core are retained but reduced. The diameter of the air holes in the single-layer air-hole array surrounding the inner core is enlarged. The spacing between adjacent air holes in the air-hole array in area 1 is reduced. The air-hole array of area 2 has 2 sub-areas that locate at the left and right lateral of the air-hole array of area 1. The air-hole array in area 2 is dislocated by half-layer spacing along y-direction relative to the air-hole array in area 1. All of the technical schemes above change the refractive index value of x-polarized mode (outer-neff-x) and y-polarized mode (outer-neff-y) of the outer core. By these technical schemes, a rectangular outer core with long sides along x-direction is formed, the diameter of the air holes in the single-layer air-hole array surrounding the outer core is enlarged, the spacing between adjacent air holes in the air-hole array in area 2 is reduced and two x-direction air holes in the outer core are retained but reduced. These combined actions make the outer-neff-x larger than the outer-neff-y. In conclusion, under the combined effects of the above technical schemes, this invention has controlled the outer-neff-x and outer-neff-y values, and has generated birefringence with the slow axis along x-direction and the fast axis along y-direction in the outer core of the fiber. Together with other fiber structural schemes, such as the square lattice arrangement of the air holes, the position of the air holes in the outer core, the diameter of the air holes in the air-hole array in the outer cladding, the values of inner-neff-x and outer-neff-x can be precisely tuned to make them equal or close in working band (In other words, inner-neff-x and outer-neff-x are matched). This leads to strong couple between inner and outer core x-polarized modes. Meanwhile, the above-mentioned technical scheme of this invention makes the fast axis directions (or slow axis directions) of the inner and outer core perpendicular to each other under. Considering that the inner-neff-x and outer-neff-x are matched in working band, the value of inner-neff-y will be much larger than that of outer-neff-y (In other words, inner-neff-y and outer-neff-y are mismatched). Thus, the couple between inner and outer core y-polarized modes is avoided.

(2) In terms of the slope of curve of mode refractive index with wavelength, the slope for the polarized inner core mode which has large negative dispersion is greatly different from the slope for the outer core with the same polarization state (In other words, the slope of curves for these two modes are mismatched).

In this invention, the following technical schemes have been used: the air holes in the single-layer air-hole array surrounding the inner core has larger diameter compared with the air holes in the single-layer air-hole array surrounding the outer core. The spacing between adjacent air holes in the air-hole arrays in area 1 and area 2 is reduced. The long side (or short side) of the inner and outer core are perpendicular to each other. The air holes in the inner and outer cladding air-hole arrays have same diameter, and they are smaller than those in the single-layer air-hole array surrounding the inner and outer core. The air-hole array of area 2 has 2 sub-areas that locate at the left and right lateral of the air-hole array of area 1. The air-hole array in area 2 is dislocated by half-layer spacing along y-direction relative to the air-hole array in area 1. Two x-direction air holes in the outer core are retained but reduced. All of the technical schemes above increase the slope difference between the curves of inner-neff-x and outer-neff-x with wavelength. Under these combined technical schemes, the slope difference between the curves of inner-neff-x and outer-neff-x with wavelength are increased. As a result, the following technical effects has achieved: around the intersection wavelength (working wavelength), the two curves of inner-neff-x and outer-neff-x with wavelength converge fast, and the difference between the value of inner-neff-x and outer-neff-x reduces significantly. This enhances the coupling strength between the inner and outer core x-polarized mode within the working band. Moving away from the intersection point, these two curves diverge fast, and the difference between the value of inner-neff-x and outer-neff-x grows significantly. This weakens the coupling strength of the inner and outer core x-polarized mode outside the working band. The final results are an abruptly drop of inner-neff-x value and large negative dispersion at the x-polarized mode of inner core within a narrow band. Moreover, the decrease of the inner-neff-x value in the working wavelength band, superimposed with the fast and slow axis of the inner core of the fiber, further increases the birefringence of the y and x-polarized modes of the inner core, which results in better performance on polarization-maintaining.

(3) In terms of energy coupling, the transition band, defined as from the wavelength where the inner core polarized mode with large negative dispersion and the outer core mode with the same polarization state never couples to the wavelength where these two modes resonate (working wavelength), is intentionally narrowed. This enhances the coupling strength and the amplitude of the large negative dispersion.

In this invention, the following technical schemes have been used: the outer core's length along x-direction is obviously longer than the working wavelength. To enlarge the diameter of air holes in the single-layer air-hole array surrounding the outer core and reduce the spacing between adjacent air holes of the air-hole array in the area 2 to appropriate values, this narrows down the silica leakage channel from which the light energy in outer core mode leaks through. The above two schemes make the light energy of the outer core x-polarized mode be more tightly confined in the outer core when the wavelength is shorter than the working wavelength. In this invention, the following technical schemes have been used: the air-hole array of area 2 has 2 sub-areas that locate at the left and right lateral of the air-hole array of area 1. The air-hole array in area 2 is dislocated by half-layer spacing along y-direction relative to the air-hole array in area 1. The diameter of air holes in the single-layer air-hole array surrounding the inner and outer core is enlarged. The above schemes make the light energy of the x-polarized modes in both inner core and outer core be more tightly confined in their corresponding core when the wavelength is shorter than the working wavelength. In this invention, the following technical schemes have been used: enlarge the diameter of air holes in the single-layer air-hole array surrounding the inner core to an appropriate value. Reduce the spacing between adjacent air holes of the air-hole array in the area 1 to an appropriate value. On the one hand, these schemes narrow down the silica leakage channel from which the light energy in outer core mode leaks through. If the wavelength is shorter than the working wavelength, the light energy of the x-polarized mode in inner core can be more tightly confined in the inner core. On the other hand, these schemes reduce the size of the inner core. Especially, the length of the inner core along x-direction is reduced to be only slightly longer than the working wavelength. This makes the light energy of the inner core x-polarized mode more likely leak to the outer core and couple with the outer core mode at the working wavelength. In this invention, the following technical schemes have been used: the air-hole array of area 2 has 2 sub-areas that locate at the left and right lateral of the air-hole array of area 1. The air-hole array in area 2 is dislocated by half-layer spacing along y-direction relative to the air-hole array in area 1. The inner and outer core's long (or short) axes are perpendicular but their central axes along x-direction coincide to each other along x. The above schemes have the effects of promoting the field distribution matching of x-polarized mode in the inner and outer core in the respect of position. The air-hole array in area 1 contains only 3 columns air holes along x-direction, and the positions of the 2 shrunken air holes in the outer core are intentionally selected. The two outer cores are located in the 2 sub-areas of the area 2 respectively. They have identical configuration and symmetrically distribute along the y-axis. The spacings between all the adjacent air holes are intentionally selected. All the above schemes have the effects of promoting light field couple between x-polarized modes of the inner and outer core within the working band. Under the above schemes, this invention greatly narrows down the transition band, defined as from the wavelength where the inner core polarized mode with large negative dispersion and the outer core mode with the same polarization state never couples to the wavelength where these two modes resonate (working wavelength). It further enhances the coupling strength and increases the absolute value of negative dispersion of inner core x-polarized mode. In addition, this invention makes the central axis of inner and outer core coincidence to each other along x-direction. This results in matched field distribution for the inner and outer core x-polarized modes, as well as mismatched field distribution for the inner and outer core y-polarized modes in the respect of position.

To solve the above-mentioned technical problems, the technical scheme of this invention is as follows:

A polarization-maintaining dispersion-compensation microstructure fiber wherein pure silica glass is used as a base material;, the fiber comprises an inner core, a single-layer air-hole array surrounding the inner core, an inner cladding air-hole array, an air-hole array in outer core, a single-layer air-hole array surrounding the outer core and an outer cladding air-hole array. The single-layer air-hole array surrounding inner core and the inner cladding air-hole array are collectively referred to the air-hole array in area 1. The air-hole array in outer core, the single-layer air-hole array surrounding the outer core, and the outer layer air-hole array are collectively referred to the air-hole array in area 2.

The air-hole array in area 1 includes 3 rows of air holes. These air holes are arranged in square lattice arrangement with an adjacent air hole spacing $\Lambda$. In area 1, two air holes in a middle row are omitted to form a solid area as the inner core; a midpoint of a line connecting centers of the two omitted air holes are defined as a coordinate original point; an axis connecting the centers of the two omitted air holes is defined as y-axis; an axis passing through the original point and perpendicular to the y-axis is defined as the x-axis. The diameter of the air holes in the single-layer air-hole array surrounding the inner core is d1. The air holes in the air-hole array in area 2 are arranged in square lattice arrangement with the adjacent air hole spacing $\Lambda$. Area 2 contains two sub-areas that are located outside area 1 in the x-direction. The air-hole arrays in area 2 and area 1 are separated by $\Lambda$ along x-direction, and dislocated by $\Lambda/2$ along y-direction. There are two outer cores that respectively located in the two sub-areas of area 2 with identical structure and are symmetrically distributed with respect to the y-axis: each of the two outer cores contains an air-hole array in the outer core and each air-hole array comprises two air holes with a diameter d3. The four air holes with the diameter d3 are located on the positive and negative x-axis respectively, with distances of $3\Lambda$ and $4\Lambda$ measured from the centers of the air holes to the original point, respectively. The diameter of the air holes in the single-layer air-hole array surrounding the outer core is d2. The diameter of the air holes in the inner cladding air-hole array and the outer cladding air-hole array are both d4. The four diameters satisfy the relationship of d1>d2>d4>d3.

Further, the air holes in the air-hole array in area 1 and the air-hole array in area 2 use the adjacent air hole spacing A in a range of 2.288-2.298 µm.

Further, the diameter d1 of the air holes in the single-layer air-hole array surrounding the inner core is in a range of 1.601-1.611 µm.

Further, the diameter d3 of the two air holes included in the air-hole array in outer core is in a range of 0.224-0.234 µm.

Further, the diameter d2 of the air holes in the single-layer air-hole array surrounding the outer core is in a range of 1.372-1.382 µm.

Further, the diameter d4 of the air holes in the inner cladding and the outer cladding air-hole arrays is in a range of 1.055-1.065 µm.

Further, the inner cladding air-hole array directly above or below the single-layer air-hole array surrounding the inner core contains more than 1 row of air holes. The two sub-areas of the air-hole array in area 2 contain more than 5 rows and 5 columns of air holes.

Compared with the existing technology, the polarization-maintaining dispersion-compensation microstructure fiber proposed by this invention has the following beneficial effects:

(1) The refractive index value matching and mode field matching between x-polarized modes in inner and outer core are simultaneously achieved, in order to ensure high coupling efficiency of the x-polarized modes at the working wavelength. Meanwhile, the refractive index value mismatching and mode field mismatching between y-polarized modes in inner and outer core are simultaneously achieved, in order to reduce the coupling of the y-polarized modes.

In this invention, the air-hole array of area 2 has 2 sub-areas that locate at the left and right lateral of the air-hole array of area 1. The air-hole array in area 2 is dislocated by half-layer spacing along y-direction relative to the air-hole array in area 1. The long (or short) axes of the inner and outer cores are perpendicular. The above schemes not only ensure the inner and outer cores' central axes coincide to each other along x-direction and the field distribution matching of x-polarized mode in the inner and outer core in the respect of position (as shown in the specific technical scheme (5)), but also achieve the matching of refractive indices between the inner core and the outer core's x-polarized modes: The air-hole arrays in area 2 and area 1 are dislocated by half-layer along y-direction. On the one hand, the localized air filling fraction at the left and right sides of the inner core is enlarged, which further reduces the average cladding refractive index at those specific positions. This leads to smaller values of inner-neff-x and inner-neff-y. On the other hand, the localized air filling fraction in the outer core that is close to the inner core is enlarged, which also reduces the average cladding refractive index at that specific position. This leads to smaller values of outer-neff-x and outer-neff-y (as shown in the specific technical scheme (2)). The long (or short) axes of the inner and outer cores are perpendicular to each other. The inner-neff-y is greater than the inner-neff-x, because the side length along y-direction for this rectangular inner core is longer than the side length along x-direction. Meanwhile, the outer-neff-x is greater than the outer-neff-y, because the side length along x-direction for this rectangular outer core is longer than the side length along y-direction (as shown in the specific technical schemes (3) and (4)). More specifically, the distance between centers of the inner and outer core is only 3.5Λ (as shown in the specific technical scheme (5)), so the refractive indices of the inner and outer core modes are jointly affected by the following parameters: the spacing Λ between adjacent air holes in the air-hole arrays in area 1 and area 2, the diameter d1 of the air holes in the single-layer air-hole array surrounding the inner core, and the diameter d2 of the air holes in the single-layer air-hole array surrounding the outer core (as shown in the specific technical schemes (3) and (4)). Among all these technical schemes and parameters, the technical schemes and parameters below control both the refractive indices of the inner and outer core modes: The air-hole array of area 2 has 2 sub-areas that locate at the left and right lateral of the air-hole array of area 1. The air-hole array in area 2 is dislocated by half-layer spacing along y-direction relative to the air-hole array in area 1. The long (or short) axes of the inner and outer cores are perpendicular. The spacing Λ between adjacent air holes in the air-hole arrays in area 1 and area 2 is reduced. d1 is larger than d4 and d2 is also larger than d4. Besides, the scheme of retaining but reducing two x-direction air holes in the outer core controls the refractive index value of the outer core mode (as shown in the specific technical schemes (3) and (4)). All the above scheme ensures the matching of inner-neff-x and outer-neff-x. Finally, the simultaneous matching of the refractive index value and mode field distribution of the inner and outer core x-polarized modes promotes the coupling strength between these two modes at the working wavelength.

Besides the advantages of simultaneous matching of the refractive index value and mode field distribution of the inner and outer core x-polarized modes, the simultaneous mismatching of field distribution (as shown in the specific technical scheme (5)) and refractive indices between the inner core y-polarized mode and the outer core y-polarized mode has been achieved in this invention by the following schemes: The air-hole array of area 2 has 2 sub-areas that locate at the left and right lateral of the air-hole array of area 1. The air-hole array in area 2 is dislocated by half-layer spacing along y-direction relative to the air-hole array in area 1. The long (or short) axes of the inner and outer cores are perpendicular but the inner and outer cores' central axes along x-direction coincide to each other along x. The dislocation of air-hole arrays in area 2 and area 1 by half-layer along y-direction changes the refractive indices of the inner and outer core modes (as shown in the specific technical scheme (2)). The perpendicular between long (or short) axes of the inner and outer cores affects the refractive indices of the inner and outer core modes. It also makes the direction of the fast axis (or slow axis) of the inner and outer core opposite (as shown in the specific technical schemes (3) and (4)). Because the distance between centers of the inner and outer core is only 3.5Λ (as shown in the specific technical scheme (5)), the refractive indices of the inner and outer core modes are jointly affected by the following parameters: the spacing Λ between adjacent air holes in the air-hole arrays in area 1 and area 2, the diameter d1 of the air holes in the single-layer air-hole array surrounding the inner core, and the diameter d2 of the air holes in the single-layer air-hole array surrounding the outer core (as shown in the specific technical schemes (3) and (4)). Among all these technical schemes and parameters, the technical schemes and parameters below control both the refractive indices of the inner and outer core modes: The air-hole array of area 2 has 2 sub-areas that locate at the left and right lateral of the air-hole array of area 1. The air-hole array in area 2 is dislocated by half-layer spacing along y-direction relative to the air-hole array in area 1. The long (or short) axes of the inner and outer cores are perpendicular. The spacing Λ between adjacent air holes in the air-hole arrays in area 1 and area 2 is reduced. d1 is larger than d4 and d2 is also larger than d4. Besides, the scheme of retaining but reducing two x-direction air holes in the outer core controls the refractive index value of the outer core mode (as shown in the specific technical schemes (3) and (4)). In addition to the matching of inner-neff-x and outer-neff-x, all the above scheme ensures the mismatching of the inner-neff-y and outer-neff-y: The value of inner-neff-y is the largest and the value of outer-neff-y is the smallest among the four polarized modes of the inner and outer cores, because the y-direction is the slow axis of the inner core and the fast axis of the outer core. Finally, the simultaneous mismatching of the refractive index value and mode field distribution of the inner and outer core y-polarized modes avoids the coupling strength between these two modes at any wavelength.

(2) In addition to the matching of the refractive indices of the inner and outer core x-polarized modes, the mismatching of the slopes of the refractive indices of the inner and outer core x-polarized modes with wavelength is achieved.

In this invention, the technical schemes and parameters below are used: The air-hole array of area 2 has 2 sub-areas that locate at the left and right lateral of the air-hole array of area 1. The air-hole array in area 2 is dislocated by half-layer spacing along y-direction relative to the air-hole array in area 1. The long (or short) axes of the inner and outer cores are perpendicular. The spacing A between adjacent air holes in the air-hole arrays in area 1 and area 2 is reduced. d1 is larger than d4 and d2 is also larger than d4. (as shown in the specific technical schemes (3) and (4)). The above-mentioned technical schemes that control the refractive indices of the inner and outer core modes, not only change the values of inner-neff-x and outer-neff-x to make them match, but also change the slope of curves of inner-neff-x and outer-neff-x with wavelength. Besides, retaining but reducing two x-direction air holes in the outer core reduces the slope of curve of the outer-neff-x with wavelength. And the scheme of d1 larger than d2 make the slope of curve of the inner-neff-x with wavelength larger than that of the outer-neff-x with wavelength (as shown in the specific technical scheme (4)). All the above schemes make the slope of curve of inner-neff-x with wavelength is the largest and the slope of curve of outer-neff-x with wavelength is the smallest among the four polarized modes' indices curves of the inner and outer cores, because the x-direction is the fast axis of the inner core and the slow axis of the outer core. As a result, the mismatching of the slopes of curves of inner-neff-x and outer-neff-x with wavelength is achieved, as well as the matching of the value of inner-neff-x and outer-neff-x. The mismatching of the slopes of curves of inner-neff-x and outer-neff-x with wavelength means: These two curves approach each other rapidly when the wavelength moves towards the resonant wavelength, which leads to the rapid decrease of the difference between the inner-neff-x and outer-neff-x's value. These two curves separate rapidly when the wavelength goes away from the resonant wavelength, which leads to the rapid increase of the difference between the inner-neff-x and outer-neff-x's value. The difference between refractive indices affects the coupling strength between two modes, and the coupling strength in turn affects the optical field distribution of the modes and their difference between refractive indices. Therefore, the increase of the slope difference between the curves of inner-neff-x and outer-neff-x with wavelength make the coupling strength between the inner and outer core x-polarized modes be rapidly weakened outside the working band, but be rapidly enhanced within the working band. This further results in the abrupt drop of the value of inner-neff-x in a narrow band. If the value of inner-neff-x is concave at the narrow bandwidth where it drops abruptly, the second derivative of the inner-neff-x to the wavelength is positive value. According to the formula of dispersion calculation, the inner core x-polarized mode has a large negative dispersion.

(3) High birefringence and excellent polarization-maintaining property in the inner core is achieved under the combined action of the birefringence caused by the C2v symmetry of the invention and the mode refractive index's abrupt change introduced by the resonance of the x-polarized modes of the inner and outer core are used to achieve In this invention, high birefringence in the inner core with fast axis along x-direction and slow axis along y-direction is generated by using the scheme of C2v symmetry of the inner core (as shown in the specific technical scheme (3)). Some of the schemes described in the specific technical schemes (2), (3) and (4) control the values of inner-neff-x and outer-neff-x. They cause the technical effect of the matching of the inner-neff-x and outer-neff-x within working band. This effect results in the strong coupling and resonance of the x-polarized modes of the inner and outer core at the wavelength where their refractive index value is the same. Because of this strong coupling and resonance, these two modes evolve into one supermode. A sharp drop of inner-neff-x value at resonant wavelength is generated. Meanwhile, some of the schemes described in the specific technical schemes (2), (3) and (4) control the slopes of curves of inner-neff-x and outer-neff-x with wavelength. The combination action of the schemes that control the values and the slopes described in the specific technical schemes (2), (3) and (4) achieves the technical effect of the mismatching of the slopes of curves of inner-neff-x and outer-neff-x with wavelength within working band. This mismatching of the slopes of curves means the coupling strength between the inner and outer core x-polarized modes is rapidly weakened outside the working band, but is rapidly enhanced within the working band. This makes the drop of the inner-neff-x value even sharper in the narrow bandwidth around the resonant wavelength. High birefringence in the inner core with the fast axis along x-direction and the slow axis along y-direction together with the abrupt drop of the value of inner-neff-x within the working band by coupling, further increases the birefringence of the y and x-polarized modes of the inner core. Finally, excellent polarization-maintaining property is achieved in this invention.

By the technical scheme proposed in this invention, the final result obtained in Example 1 is: the dispersion value of the inner core x-polarized mode is −3131 ps/(nm·km), and the birefringence value of the inner core y and x-polarized modes is $8.04 \times 10^{-4}$ at 1516.1 nm. The final result obtained in Example 2 is: the dispersion value of the inner core x-polarized mode is −3144 ps/(nm·km), and the birefringence value of the inner core y and x-polarized modes is $8.53 \times 10^{-4}$ at 1550 nm. The final result obtained in Example 3 is: the dispersion value of the inner core x-polarized mode is −3149 ps/(nm·km), and the birefringence value of the inner core y and x-polarized modes is $8.97 \times 10^{-4}$ at 1583.8 nm.

DETAILED DESCRIPTION OF PREFERRED EMBODIMENTS

The meanings of the diagrams in the section of the embodiments and the technical schemes' description are given below to better illustrate the technical schemes of the embodiments and their technical schemes. Obviously, the designs presented in the following section are merely some examples of this invention. Other designs can be obtained without creative efforts from these drawings for the practitioners in the field.

Figure 1:
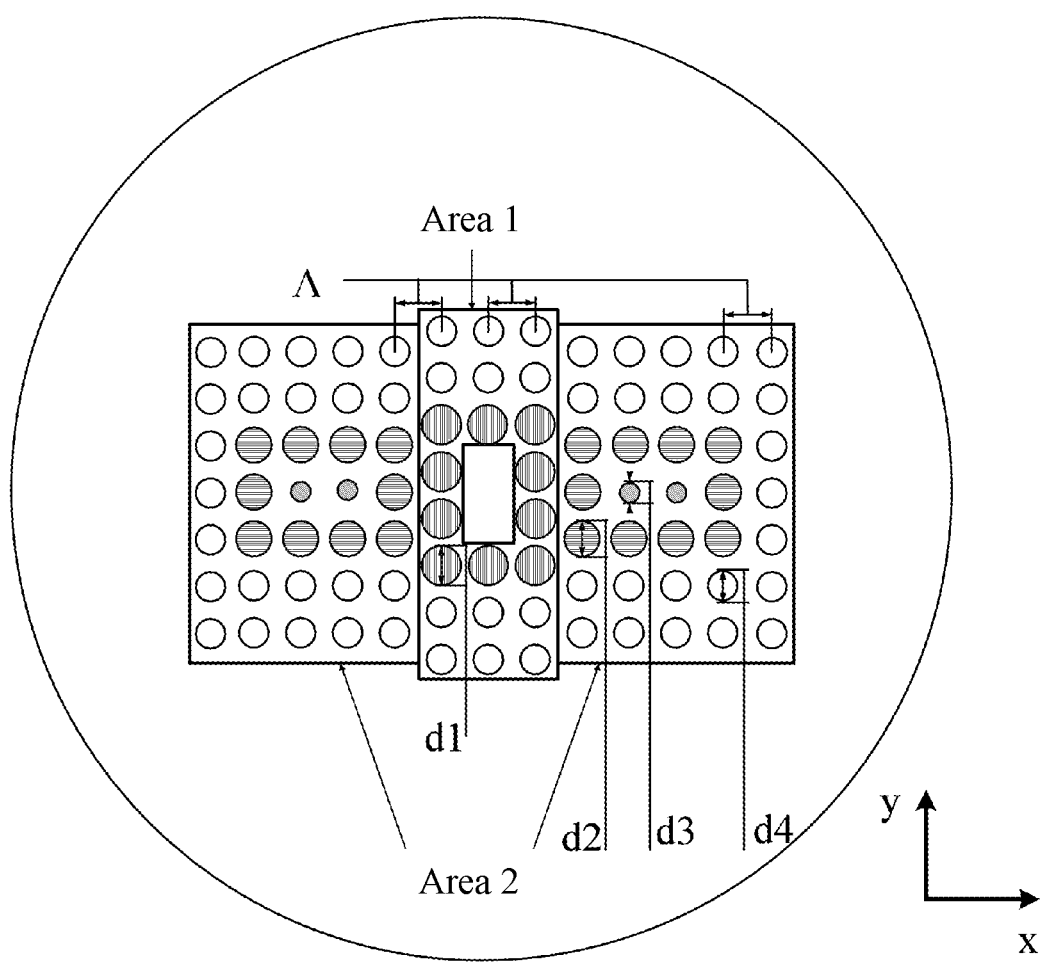
FIG. 1 shows a cross-sectional schematic of Example 1.
Figure 5:
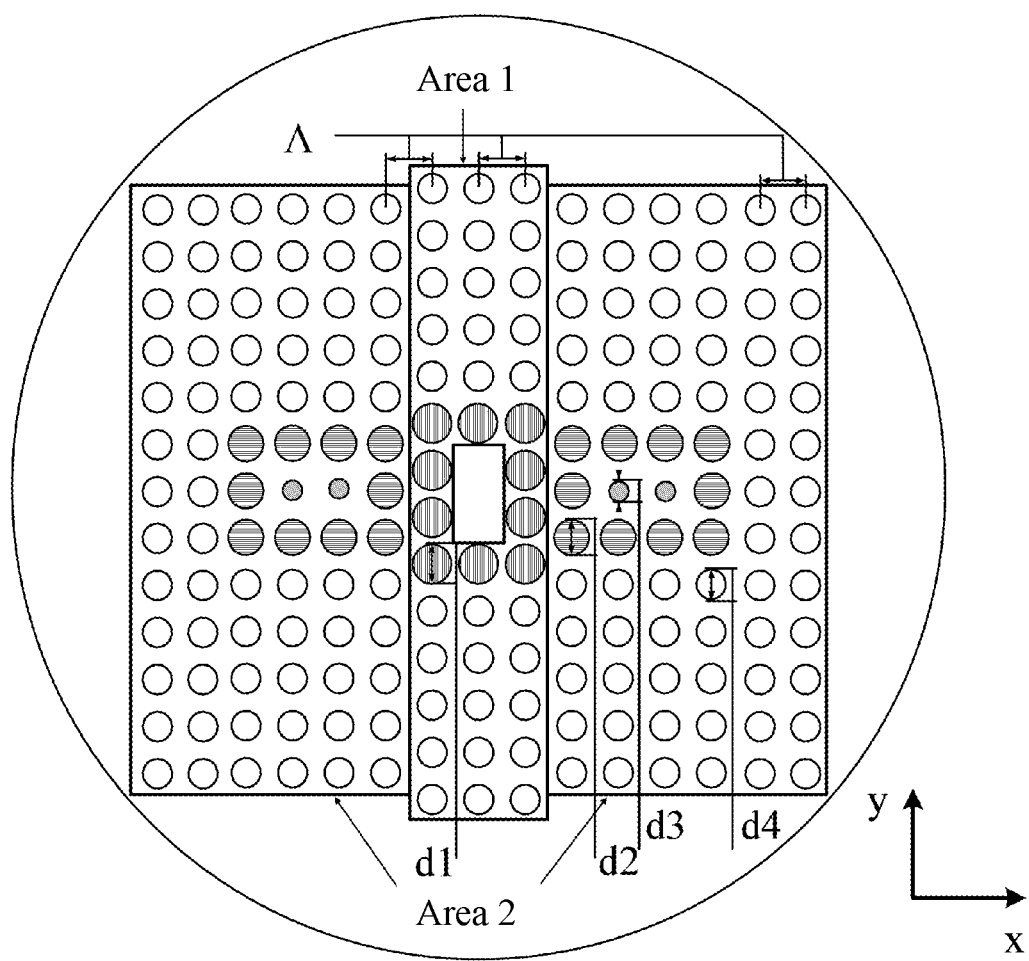
FIG. 5 shows the cross-sectional schematic of Example 2.
Figure 9:
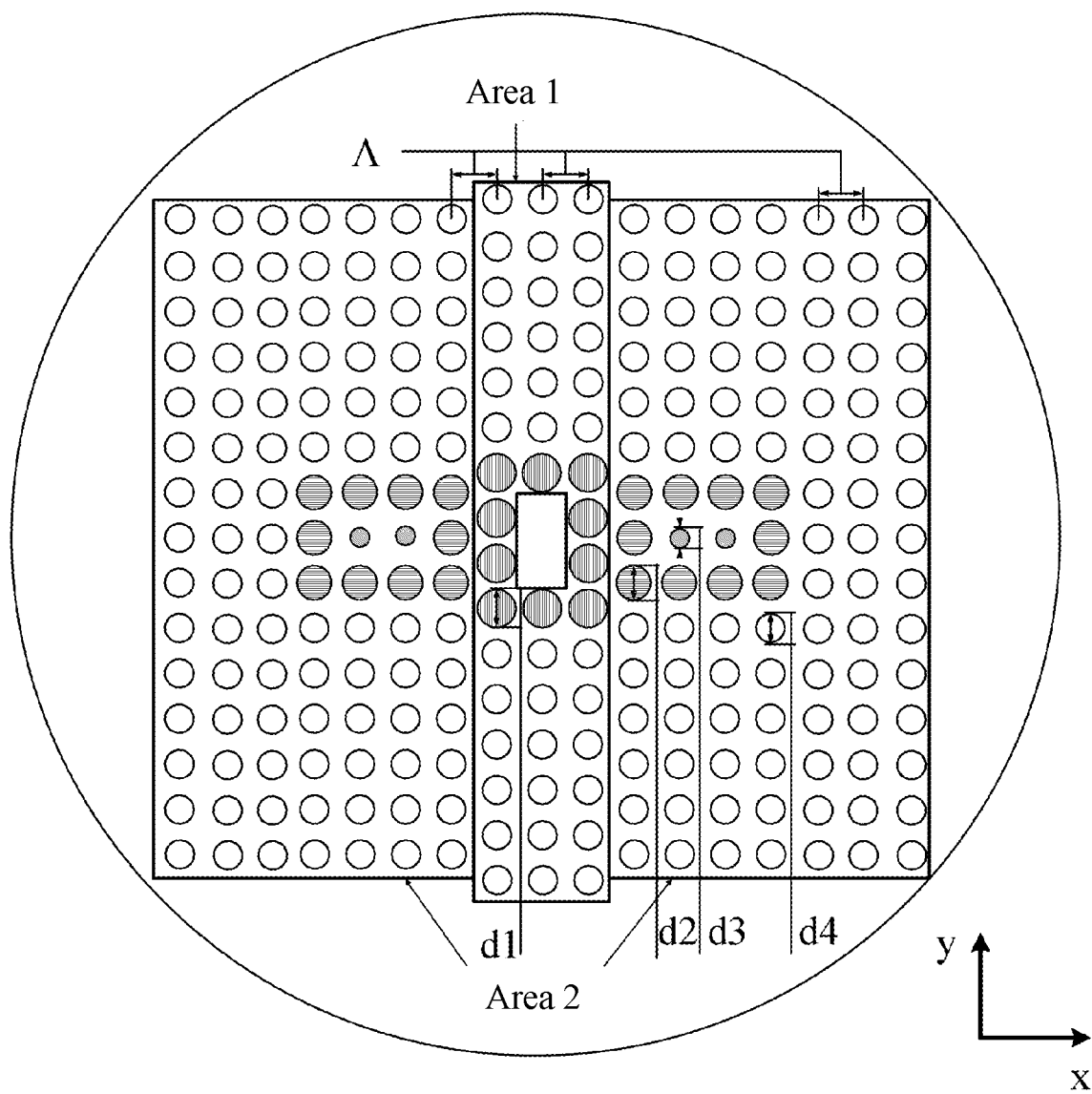
FIG. 9 shows the cross-sectional schematic of Example 3.

The detailed structures of three examples of the polarization-maintaining dispersion-compensation MSF are proposed in FIG. 1, FIG. 5 and FIG. 9. This kind of MSFs uses pure silica glass as the base material. The fiber comprises an inner core, a single-layer air-hole array surrounding the inner core, an inner cladding air-hole array, an air-hole array in outer core, a single-layer air-hole array surrounding the outer core and an outer cladding air-hole array. The single-layer air-hole array surrounding inner core and the inner cladding air-hole array are collectively referred to the air-hole array in area 1. The air-hole array in outer core, the single-layer air-hole array surrounding the outer core, and the outer layer air-hole array are collectively referred to the air-hole array in area 2. The air-hole array in area 1 includes 3 rows of air holes. These air holes are arranged in square lattice with an adjacent air hole spacing A in the range of 2.288-2.298 μm. In area 1, two air holes in the middle row are omitted to form a solid area as the inner core (The midpoint of the line connecting the centers of the two omitted air holes are defined as the coordinate original point. The axis connecting the centers of the two omitted air holes is defined as y-axis. The axis passing through the original point and perpendicular to the y-axis is defined as the x-axis). The diameter $d_1$ of the air holes in the single-layer air-hole array surrounding the inner core is in the range of 1.601-1.611 μm. The air holes in the air-hole array in area 2 are arranged in square lattice with the adjacent air hole spacing $\Lambda$ in the range of 2.288-2.298 m. Area 2 contains two sub-areas that are located outside area 1 in the x-direction. The air-hole arrays in area 2 and area 1 are separated by $\Lambda$ along x-direction, and dislocated by $\Lambda/2$ along y-direction. There are two outer cores that respectively located in the two sub-areas of area 2 with identical structure and are symmetrically distributed with respect to the y-axis. Each of the two outer cores contains an air-hole array in the outer core and each air-hole array comprises two air holes with a diameter $d_3$ in the range of 0.224-0.234 μm. The four air holes with the diameter $d_3$ are located on the positive and negative x-axis respectively, with distances of $3\Lambda$ and $4\Lambda$ measured from the centers of the air holes to the original point, respectively. The diameter $d_2$ of the air holes in the single-layer air-hole array surrounding the outer core is in the range of 1.372-1.382 μm. The diameter $d_4$ of the air holes in the inner cladding air-hole array and the outer cladding air-hole array is in the range of 1.055-1.065 μm. The four diameters satisfy the relationship of $d_1>d_2>d_4>d_3$. The inner cladding air-hole array directly above or below the single-layer air-hole array surrounding the inner core contains more than 1 row of air holes. The two sub-areas of the air-hole array in area 2 contain more than 5 rows and 5 columns of air holes.

The specific technical scheme of this patent can be described as:

(1) The invented fiber uses pure silica glass as the base material. Pure silica glass is one of the most commonly used low cost materials to fabricate fiber, who has excellent optical and other physical properties.

The air hole arrays in area 1 and area 2 are arranged in square lattice with the adjacent air hole spacing $\Lambda$. These square-lattice arranged air hole arrays have C4v symmetry. They are mainly used to control the refractive indices of the inner and outer core modes. The C4v symmetrical structure itself does not generate birefringence in the two perpendicular polarized modes for both the inner and outer core.

On this basis, the two sub-areas of area 2 are located outside right and left laterals of area 1 with dislocation to area 1 by half-layer ($\Lambda/2$) along y-direction. Then, the symmetry of the entire fiber structure is reduced to C2v. This dislocation increases the localized air filling fraction at the left and right sides of the inner core (the innermost three-air-hole areas in the single-layer air-hole array surrounding the left and right outer cores). This further reduces the average cladding refractive index at these specific locations. Therefore, the dislocation of C4v symmetrical area 1 and area 2 decreases both inner-neff-x and inner-neff-y, with a greater influence on inner-neff-x. All the above schemes, combined with the schemes described in (3) and (4) below, generate the technical effect of increasing the birefringence between the y and x-polarized modes of the inner core (with fast axis along x-direction and slow axis along y-direction). This makes the inner core better polarization-maintaining property. This dislocation of area 1 and area 2 also increases the slope of curve of the inner-neff-x with wavelength. This promotes the coupling strength between the x-polarized modes of inner and outer cores at the working wavelength. Besides, this dislocation of area 1 and area 2 increases the localized air filling fraction in the outer core that is close to the inner core (the four-air-hole areas in the left and right columns of the single-layer air-hole array surrounding the inner core). This further reduces the average cladding refractive index at those specific locations. Therefore, the dislocation of C4v symmetrical area 1 and area 2 decreases both outer-neff-x and outer-neff-y. All the above schemes, combined with the schemes described in (4) below, generate the technical effect of control of the value of outer-neff-x and outer-neff-y to form a birefringence with the slow and fast axis along x and y-direction respectively in the outer core.

In addition, the air hole arrays in area 1 and area 2 are arranged in square lattice with the adjacent air hole spacing $\Lambda$. The two sub-areas of area 2 are located outside right and left laterals of area 1 with dislocation to area 1 by half-layer ($\Lambda/2$) along y-direction. The above-mentioned schemes make the air holes in single-layer air-hole array surrounding inner core and the air holes in single-layer air-hole array surrounding outer cores block each other's silica glass channel. This is helpful to confine the light energy of the x-polarized modes in both inner and outer cores more tightly in their corresponding core when the wavelength is shorter than the working wavelength. All the above schemes, combined with the scheme described in (3) and (4) below, greatly narrows down the transition band, defined as from the wavelength where the inner core x-polarized mode and the outer core x-polarized mode never couples to the wavelength where these two modes resonate (also denoted as working wavelength). This enhances the coupling strength and increases the absolute value of the negative dispersion of the inner core x-polarized mode.

(3) By omitting 2 consecutive air holes on the y-axis, a solid area is formed. This solid area surrounded by the first layer of air-hole arrays is the quasi-rectangle inner core. The side length along y-direction (long side) for this rectangular inner core is $(2+1)\Lambda-d1$, the side length along x-direction (short side) for this rectangular inner core $2\Lambda-d1$. Both values are related to the number and direction of the omitted consecutive air holes (2 consecutive air holes on the y-axis), the adjacent air hole spacing A of air hole array in the area 1 and the diameter d1 of the air holes in the first-layer air hole array surrounding the inner core. This means that the value, the slope of curve of refractive index with wavelength and the birefringence of the inner core modes are simultaneously affected by the following schemes and parameters: the adjacent air hole spacing A of air hole array in the area 1, omitting 2 consecutive air holes on the y-axis to form the inner core, and the diameter d1 of the air holes in single-layer air-hole array surrounding inner core larger than the diameter d4 of the air holes in inner cladding air-hole array.

To control the mode refractive indices and birefringence of the inner core, the rectangular inner core has C2v symmetry. According to the calculation formula of the side length of the inner core given in the previous paragraph, the side length along y-direction is longer than the side length along x-direction. This means the inner-neff-y is larger than the inner-neff-x and the birefringence in the inner core has the characteristic of fast axis along x-direction and slow axis along y-direction. Either increasing the diameter d1 of the air holes in the single-layer air-hole array surrounding the inner core, or reducing the adjacent air hole spacing Λ of air hole array in the area 1, reduces the side length along both x- and y-direction for the inner core. The above-mentioned schemes lead to the following effects. Firstly, the inner-neff-x and inner-neff-y are reduced. Secondly, the length of the inner core along x-direction is shortened to be only slightly longer than the working wavelength. This makes the light energy in the inner core x-polarized mode more easier leak to the outer core and couple with the outer core mode at the working wavelength. Thirdly, the leakage channel from which the light energy in inner core mode leaks through is narrowed down. Combined with the scheme described in (2), the light energy of the inner core's x-polarized mode is more tightly confined in inner core when the wavelength is shorter than the working wavelength.

Length to width ratio of the inner core is:

$$1+\frac{1}{2-\frac{d_1}{\Lambda}}.$$

Either increasing the diameter d1 of the air holes in the single-layer air-hole array surrounding the inner core, or reducing the adjacent air hole spacing Λ of air hole array in the area 1, increases length to width ratio of the inner core. The technical effect of increasing the birefringence in the inner core with fast axis along x-direction and slow axis along y-direction is generated.

The diameter d4 of the air holes in the inner cladding is smaller than the diameter d1 of the air holes in the single-layer air-hole array surrounding the inner core. This technical scheme reduces the air filling fraction of the cladding air-hole array of the inner core along y-direction, which further increases the average refractive index of this air-hole array and its surrounding silica glass background. This results in the increase of the inner-neff-y. Meanwhile, either increasing the diameter d2 of the air holes in the single-layer air-hole array surrounding the outer core to larger than the diameter d4 of the air holes in the inner cladding air-hole array, or reducing the spacing Λ between adjacent air holes in the air-hole arrays in area 2, increases the air filling fraction of single-layer air-hole array surrounding outer core, which further reduces the average refractive index of this air-hole array and its surrounding silica glass background. From the perspective of the inner core, all these schemes increase the air filling fraction of the second-layer air hole array of the inner core along x-direction, and reduces the average refractive index of this air-hole array and its surrounding silica glass background. This reduces the inner-neff-x. Hence, all the schemes of d4<d1, d2>d4 and reducing the spacing Λ between adjacent air holes in the air-hole arrays in area 2 act together to increase the difference between the value of inner-neff-x and inner-neff-y, i.e., increase the birefringence between the y- and x-polarized modes of the inner core.

To control the slope of curve of the mode refractive index with wavelength in inner core, the side length along y-direction is longer than the side length along x-direction for the inner core. This makes the slope of curve of the inner-neff-x with wavelength larger than that of the inner-neff-y with wavelength. Either increasing the diameter d1 of the air holes in the single-layer air-hole array surrounding the inner core, or reducing the adjacent air hole spacing A of air hole array in the area 1, increases the air filling fraction of single-layer air-hole array surrounding inner core. It further reduces the average refractive index of this air-hole array and its surrounding silica glass background. The above schemes increase the slope of curves of the inner-neff-x and inner-neff-y with wavelength, with a greater influence on the slope of curve of inner-neff-x with wavelength. Either increasing the diameter d2 of the air holes in the single-layer air-hole array surrounding the outer core to larger than the air hole diameter d4 in the inner cladding air-hole array, or reduce the spacing Λ between adjacent air holes in the air-hole arrays in area 2, increases the air filling fraction of single-layer air-hole array surrounding outer core. It further reduces the average refractive index of this air-hole array and its surrounding silica glass background. From the perspective of the inner core, all these schemes increase the air filling fraction of the second-layer air hole array of the inner core along x-direction, and reduce the average refractive index of this air-hole array and its surrounding silica glass background. This increases the slope of curve of the inner-neff-x with wavelength. Hence, all the schemes of short and long axis along the x- and y-direction respectively in inner core, d1>d4, reducing the spacing Λ between adjacent air holes in the air-hole arrays in area 1 and area 2 and d2>d4 act together to increase the slope of the curve of inner-neff-x with wavelength, and to increase the slope difference between the curves of inner-neff-x and outer-neff-x with wavelength. Meanwhile, the birefringence between the y and x-polarized modes of the inner core is increased.

Under the combined action of the scheme described in section (3) and section (2), high birefringence with fast axis along x-direction and slow axis along y-direction is generated in the inner core. This achieves the technical effect of maintaining the light's polarization state along the x-direction. In addition, all the above schemes together with the schemes described in (2) and (4), achieve the technical effect of increasing the slope difference between the curves of inner-neff-x and outer-neff-x with wavelength.

(4) The calculated average refractive index by the area ratio between the air holes in a certain cell and its surrounding silica glass background for a square arranged air-hole array is:

$$\left[1 - \frac{\pi}{4}\left(\frac{d}{\Lambda}\right)^2\right]n_{silica} + \frac{\pi}{4}\left(\frac{d}{\Lambda}\right)^2 n_{air}$$

wherein $n_{silica}$ represents the refractive index of pure silica glass; $n_{air}$ represents the refractive index of air whose value is 1.0). Decrease the diameter d3 of two consecutive air holes along x-axis to smaller than the diameter d4 of the air holes in outer cladding air-hole array. According to the above formula, this reduces the air filling fraction of these two air-hole array areas to smaller than the air filling fraction of the air holes in outer cladding air-hole array. Increase the diameter d2 of the air holes in the single-layer air-hole array surrounding the outer core to larger than the diameter d4 of the air holes in the inner cladding air-hole array. According to the above formula, this compresses the silica glass area around the two air-hole array. Taking the above two factors into consideration, the localized average refractive index of the two air-hole array is:

$$\left[1 - \frac{\pi d3^2}{2(3\Lambda - d2)(2\Lambda - d2)}\right] \times n_{silica} + \frac{\pi d3^2}{2(3\Lambda - d2)(2\Lambda - d2)}.$$

It is greater than the average refractive index of the outer cladding, which is:

$$\left[1 - \frac{\pi}{4}\left(\frac{d_4}{\Lambda}\right)^2\right]n_{silica} + \frac{\pi}{4}\left(\frac{d_4}{\Lambda}\right)^2.$$

Therefore, the quasi-rectangle area with holes in the center, which consist of two-air-hole array and silica glass background surrounded by the first layer of air-hole arrays, is used as outer core. For the outer core, the side length along y-direction (long side) is (2+1)Λ−d2, the side length along x-direction (short side) is 2Λ−d2. According to the quantitative relationship of the above technical schemes, the refractive indices' value of the outer core modes, the slopes of the curves of refractive index with wavelength of the outer core modes, and the birefringence between the outer core modes are simultaneously affected by the outer core's structure and related parameters: the spacing Λ between adjacent air holes in the air-hole arrays in area 2, reducing the diameter of two consecutive air holes on the x-axis to d3<d4 to form the outer core, and d2>d4.

To control the mode refractive indices and birefringence of the outer core, this invention retains but reduces the two x-direction air holes in the outer core. According to the calculation formula of the average refractive index of outer core in the previous paragraph, this scheme reduces the average refractive index compared with directly omitting air holes to form a pure silica glass area. Hence, the refractive index of the outer core is smaller than the refractive index of the inner core. This further reduces the values of outer-neff-x and outer-neff-y. The outer core has a rectangular shape with C2v symmetry, and the side length along x-direction is longer than the side length along y-direction. This makes the outer-neff-x greater than the out-neff-y. The birefringence with slow axis along x-direction and fast axis along y-direction is generated in the outer core. In addition, either increasing the diameter d2 of the air holes in the single-layer air-hole array surrounding the outer core, or reducing the spacing Λ between adjacent air holes in the air-hole arrays in area 2, reduces both the side length of the outer core along x- and y-direction. On the one hand, these schemes reduce the outer-neff-x and outer-neff-y. On the other hand, these schemes not only increase the length of the outer core along x-direction (which is calculated by 3Λ−d2) to make it much longer than the working wavelength, but also narrow down the leakage channel from which the light energy in outer core mode leaks through. This ensures the light energy of the outer core x-polarized mode be more tightly confined in the outer core when the wavelength is shorter than the working wavelength.

To outer core, the x-direction is its slow axis and the x-direction is its fast axis. According to the formula of length to width ratio of the outer core, which is:

$$1 + \frac{1}{2 - \frac{d_2}{\Lambda}},$$

either increasing the diameter d2 of the air holes in the single-layer air-hole array surrounding the outer core, or reducing the spacing Λ between adjacent air holes in the air-hole arrays in area 2, increases length to width ratio of the outer core. This further increase the existing birefringence with slow axis along x-direction and fast axis along y-direction in the outer core. However, the outer core is not used for optical signal transmission in this invention. It is unnecessary to maintain the polarization state of the light in outer core by large birefringence value. Considering that the long side (or short side) of the inner and outer core are perpendicular to each other and the length to width ratio of outer core is increased by increasing d2 and reducing A, these technical schemes are sufficient to ensure the inner and outer core have opposite direction of the fast axis (or slow axis). Because the y-direction is the slow axis of the inner core but the fast axis of the outer core, the value of inner-neff-y is the largest and the value of outer-neff-y is the smallest among the four polarized modes of the inner and outer cores. This ensures the largest difference between inner-neff-y and outer-neff-y (i.e. the mismatching between inner-neff-y and outer-neff-y) is achieved. As a result, the following effect is achieved: the couple between inner and outer core y-polarized modes is avoided at any wavelength, while the couple between inner and outer core x-polarized modes is achieved due to the matching between inner-neff-x and outer-neff-x at working wavelength.

In addition, either increasing the diameter d1 of the air holes in single-layer air-hole array surrounding inner core to larger than the diameter d4 of the air holes in the inner cladding, or reducing the spacing A between adjacent air holes in the air-hole arrays in area 1, increases the air filling fraction of single-layer air-hole array surrounding inner core. This in turn reduce the average refractive index of this air-hole array and its surrounding silica glass background. From the perspective of the outer core, both schemes increase the air filling fraction of the second-layer air hole array of the outer core along inside x-direction, and reduces the average refractive index of this air-hole array and its surrounding silica glass background. These schemes are mainly used to reduce the value of outer-neff-x to match the value of inner-neff-x. They have little impacts on the value of outer-neff-y.

In this invention, all the four schemes of retaining but reducing the two x-direction air holes in the outer core, d2>d4, reducing the spacing Λ between adjacent air holes in the air-hole arrays in area 1 and area 2 and d1>d4 act together to control outer-neff-x and outer-neff-y, together with the related scheme described in (2). These result in the birefringence with slow axis along x-direction and fast axis along y-direction in the outer core and the decrease of the value of outer-neff-x simultaneously. Under the combined action of the schemes that control the value of inner-neff-x described in section (2) and (3), the technical effect of the matching of the inner-neff-x and outer-neff-x within working band is achieved. The curves of the value of inner-neff-x and outer-neff-x with wavelength gradually approach each other with the redshift of the wavelength within the working band, and finally the values of inner-neff-x and outer-neff-x equal at a certain wavelength. According to the coupled mode theory, with other factors unchanged, the smaller the refractive index's difference between two modes is, the stronger the energy couple between them is. This invention's related technical schemes and specific structural parameters not only achieve the matching of inner-neff-x and outer-neff-x, but also promote the couple strength between inner and outer core x-polarized modes. These leads to the light energy of the x-polarized modes in the inner core spread to outer core and the light energy of the x-polarized modes in the outer core spread to inner core within the working wavelength. The light energy distribution and the refractive indices of x-polarized modes in both the inner and outer core are changed by coupling. Especially, very strong coupling, even resonance between the x-polarized modes of the inner and outer core happens at the wavelength where their refractive indices are equal. This resonance causes the two modes evolve into one supermode, with a sharp drop of inner-neff-x value at resonant wavelength.

To control the slope of curve of the mode refractive index with wavelength in outer core, the side length along x-direction is longer than the side length along y-direction for the outer core. This makes the slope of curve of the outer-neff-x with wavelength larger than that of the outer-neff-y with wavelength. Retaining but reducing two x-direction air holes in the outer core reduces the average refractive index of the outer core and further reduces the refractive index difference between the outer core and its cladding. This leads to the decrease of the slope of curve of the outer-neff-x with wavelength. The diameter d4 of the air holes in the outer cladding air-hole array is smaller than the diameter d2 of the air holes in single-layer air-hole array surrounding outer core. This scheme reduces the air filling fraction of the outer cladding air-hole array, then increases the average refractive index of this air-hole array and its surrounding silica glass background. The slope of curve of the outer-neff-x with wavelength is further reduced. Increasing the diameter of the air holes in the first-layer air hole array surrounding the inner core and outer core increases both the slopes of curves of the inner core and outer core polarized modes. However, to set the diameter d2 of the air holes in the first-layer air hole array surrounding the inner core smaller than the diameter d1 of the air holes in the first-layer air hole array surrounding the outer core, this increases the slope difference between the curves of inner-neff-x and outer-neff-x with wavelength. This results in the technical effect of the mismatching of the slope of the curves of inner-neff-x and outer-neff-x with wavelength. Finally, the mismatching of the slope of the curves of inner-neff-x and outer-neff-x with wavelength is achieved by all the schemes that control the slope of curve of inner-neff-x with wavelength described in (2) and (3) and all the technical schemes mention above, including the side length along x-direction for the outer core longer than the side length along y-direction, two x-direction air holes in the outer core retained but reduced, d4 smaller than d2 and d2 smaller than d1. The mismatching of the slope of the curves ensures that two curves approach each other rapidly when the wavelength moves towards the resonant wavelength, which leads to the rapid decrease of the difference between the inner-neff-x and outer-neff-x's value. While these two curves separate rapidly when the wavelength moves away from the resonant wavelength, which leads to the rapid increase of the difference between the inner-neff-x and outer-neff-x's value. According to the coupled mode theory and the previous description, the difference between refractive indices of two modes has impact on their coupling strength, and the coupling strength in turn affects the modes' field distribution and their refractive index difference. Therefore, increasing the slope mismatching between the curves of inner-neff-x and outer-neff-x with wavelength achieves the technical effect that the coupling strength between the inner and outer core x-polarized modes is rapidly weakened outside the working band, but is rapidly enhanced within the working band. This further results in the abrupt drop of the value of inner-neff-x within a narrow band. The dispersion of a fiber can be calculated by the formula of:

$$D(\lambda) = -\frac{\lambda}{c}\frac{d^2 n_{\textit{eff}}}{d\lambda^2}$$

wherein c represents the speed of light in vacuum, X represents the wavelength of light. If the curve of inner-neff-x is concave and drops abruptly in a narrow bandwidth, the second derivative of the inner-neff-x to the wavelength $$\frac{d^2 n_{\textit{eff}}}{d\lambda^2}$$

has a positive value. According to the formula of dispersion, the inner core x-polarized mode then has a large negative dispersion. In addition, the abrupt drop of the value of inner-neff-x by coupling increases the birefringence of the y and x-polarized modes of the inner core with in the working band. It generates higher birefringence with the fast axis along x-direction and the slow axis along y-direction to better maintain the polarization of the light in inner core.

(5) The air-hole array in area 1 contains only 3 columns air holes along x-direction. The distance between adjacent two columns of air holes of the air-hole arrays in area 2 and area 1 is Λ along x-direction. The outer core is formed by reducing the 2 air holes in each sub-areas of the air-hole array of area 2, which are located at the second and third nearest layer away from the boundary of area 1 along x-direction. These three schemes set the distances from the central of the 2 shrunken air holes in in each sub-areas of area 2 to the center of the inner core as 3Λ and 4Λ, respectively. In other words, the distance between the centers of the inner and outer core is only 3.5Λ. This makes the x-polarized modes of the inner and outer core is apt to couple with each other. The length of the inner core along x-direction is adjusted to be only slightly longer than the working wavelength as stated in (3). The light energy in the inner core x-polarized mode leaks more easily to the outer core at the working wavelength. The air-hole array of area 2 has 2 sub-areas that locate at the left and right lateral of the air-hole array of area 1. The air-hole array in area 2 is dislocated by half-layer spacing along y-direction relative to the air-hole array in area 1. The long (or short) axes of the inner and outer cores are perpendicular. These above-mentioned 3 schemes ensure that the inner and outer cores' central axes along x-direction coincide to each other. In other words, the center of the inner core and outer core locate at the same central axes along x-direction. This makes the field distribution matching between x-polarized modes in the inner and outer core in the respect of position. Besides, the 2 outer cores in each sub-areas of area are identical in structure, and they distribute symmetrically along the y-axis. All the technical schemes stated in this paragraph is used to increase the absolute value of the negative dispersion of the inner core x-polarized mode by enhance the coupling strength between the x-polarized modes of inner and outer core at the resonant wavelength.

It is stated in (2) that the air holes in single-layer air-hole array surrounding inner core and the air holes in single-layer air-hole array surrounding outer cores block each other's silica glass leaking channel. On the basis of this, the diameters d1 and d2 of the air holes in single-layer air-hole array surrounding inner core and outer core are larger than the diameter d4 of the air holes in inner and outer cladding air-hole array. This further enhances the air holes' blocking on the silica glass channel. It is stated in (3) that the silica leakage channel from which the light energy in the inner core x-polarized mode leaks through is narrowed down. It is stated in (4) that the outer core's length along x-direction is obviously longer than the working wavelength and the silica leakage channel from which the light energy in the outer core x-polarized mode leaks through is narrowed down. All the above-mentioned schemes make sure the light energy of the x-polarized modes in both inner core and outer core is more tightly confined in their corresponding core when the wavelength is shorter than the working wavelength. Finally, this invention greatly narrows down the transition band, defined as from the wavelength where the inner core x-polarized mode and the outer core x-polarized mode never couples to the wavelength where these two modes resonate.

The inner core's length along y-direction is (3Λ-d1), which is obviously longer than the working wavelength. This ensures the light energy of the inner core y-polarized mode be tightly confined in the inner core, without leaking to the outer core. The air-hole array of area 2 has 2 sub-areas that locate at the left and right lateral of the air-hole array of area 1. The air-hole array in area 2 is dislocated by half-layer spacing along y-direction relative to the air-hole array in area 1. The long (or short) axes of the inner and outer cores are perpendicular. These above-mentioned 3 schemes ensure that the inner and outer cores' central axes along x-direction coincide to each other. To x-polarized modes in the inner and outer core, their field distributions are matched in position to enhance their coupling. However, to y-polarized modes in the inner and outer core, their field distributions are mismatched in position, which reduce their losses. In (4), it is stated that the inner and outer core with opposite direction of the fast axis (or slow axis) is constructed to increase the difference between inner-neff-y and outer-neff-y. By all the technical schemes above, the technical effect of avoiding the coupling is achieved between the inner and outer core y-polarized mode at the working band.

Example 1

In this example, the adjacent air hole spacing Λ is 2.288 μm. The diameter d1 of the air holes is 1.601 μm. The diameter d2 of the air holes is 1.372 μm. The diameter d3 of the air holes is 0.224 μm. The diameter d4 of the air holes is 1.055 μm. The inner cladding air-hole array directly above or below the single-layer air-hole array surrounding the inner core contains 2 row of air holes. The two sub-areas of the air-hole array in area 2, each contains 7 rows and 6 columns of air holes.

Figure 2:
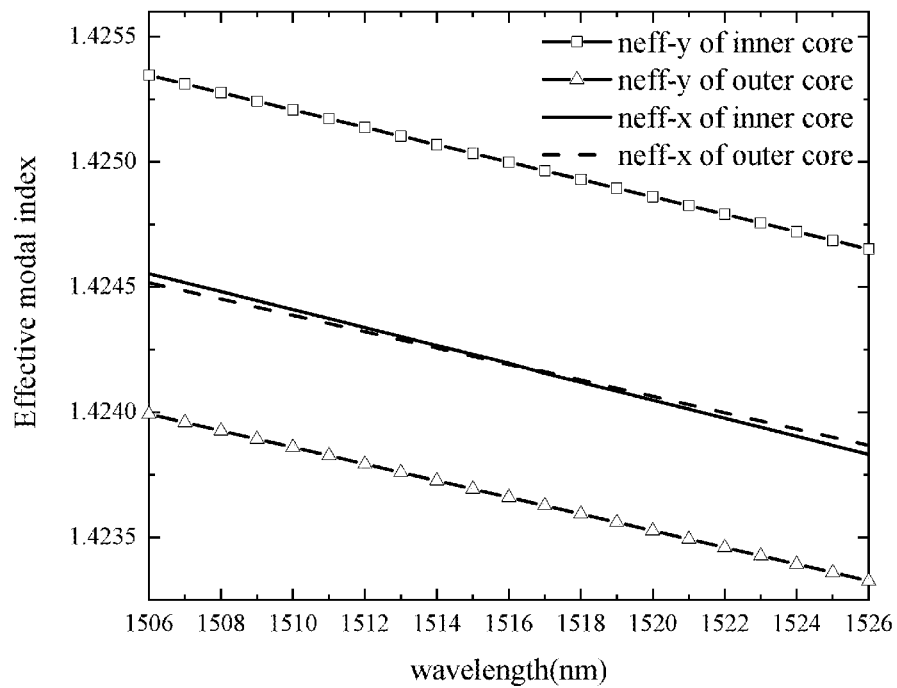
FIG. 2 shows the curves of the refractive indices of the inner and outer core modes with wavelength in Example 1.
Figure 2:
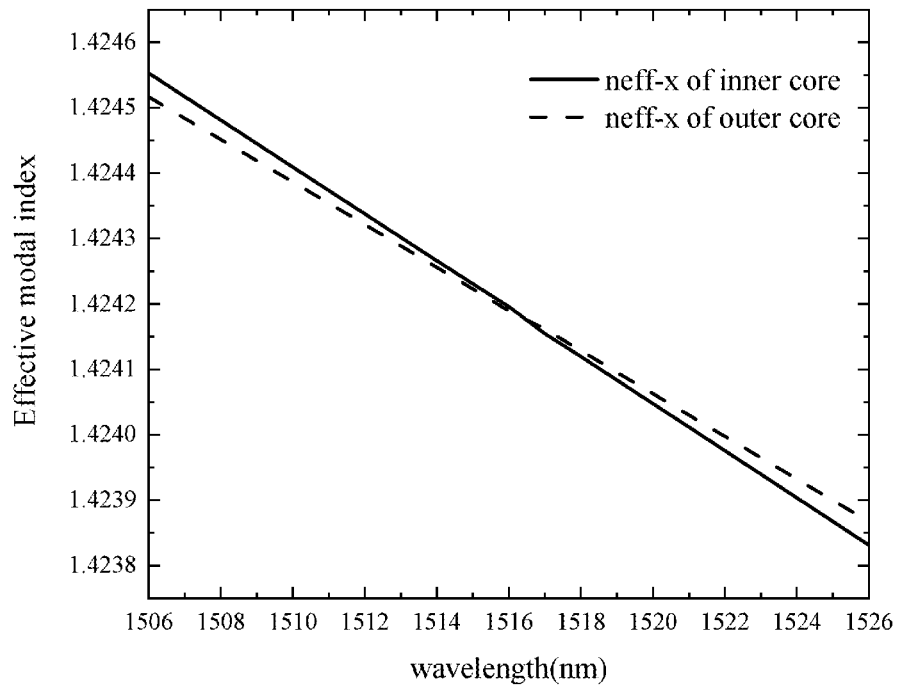

As shown in FIG. 2(a), the inner-neff-y is larger than the inner-neff-x. The birefringence with fast axis along x-direction and slow axis along y-direction is generated in the inner core. The outer-neff-x is larger than the outer-neff-y. The birefringence with slow axis along x-direction and fast axis along y-direction is generated in the outer core. Because the y-direction is the slow axis of the inner core and the fast axis of the outer core, the value of inner-neff-y is the largest and the value of outer-neff-y is the smallest among the four polarized modes of the inner and outer cores. Finally, the mismatching of refractive indices between the inner core and the outer core y-polarized mode is achieved.

Figure 3:
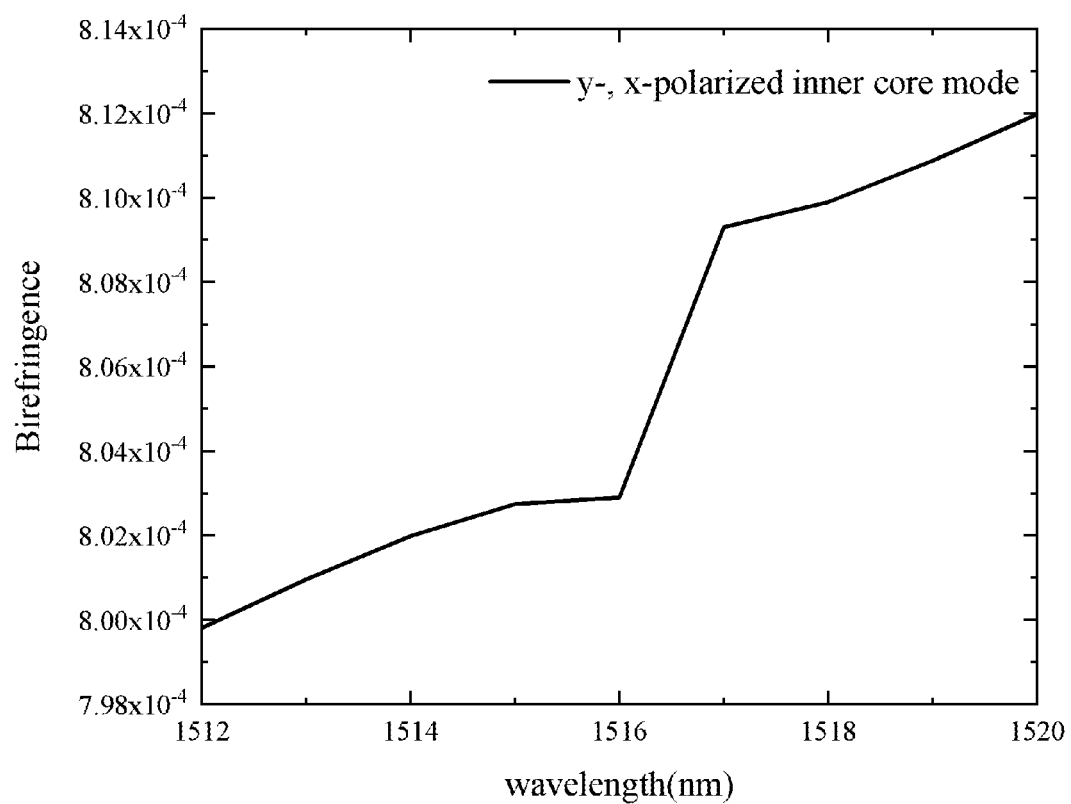
FIG. 3 shows the birefringence curve of the inner core y and x-polarized modes with wavelength in Example 1.

As shown in FIG. 2(b), the two curves approach each other rapidly when the wavelength moves towards the resonant wavelength. This leads to the rapid decrease of the difference between the inner-neff-x and outer-neff-x's value. These two curves separate rapidly when the wavelength moves away from the resonant wavelength. This leads to the rapid increase of the difference between the inner-neff-x and outer-neff-x's value. This leads to the coupling strength between the inner and outer core x-polarized modes be rapidly weakened outside the working band, but be rapidly enhanced within the working band. This further results in the abrupt drop of the value of inner-neff-x in a narrow band. Because the birefringence in inner core originally has the fast axis along x-direction and the slow axis along y-direction, the abrupt drop of the value of inner-neff-x within the working band by coupling of the inner and outer core x-polarized mode further increases this birefringence. As shown in FIG. 3, the birefringence value of the inner core y and x-polarized modes is $8.04 \times 10^4$ at 1516.1 nm.

Figure 4:
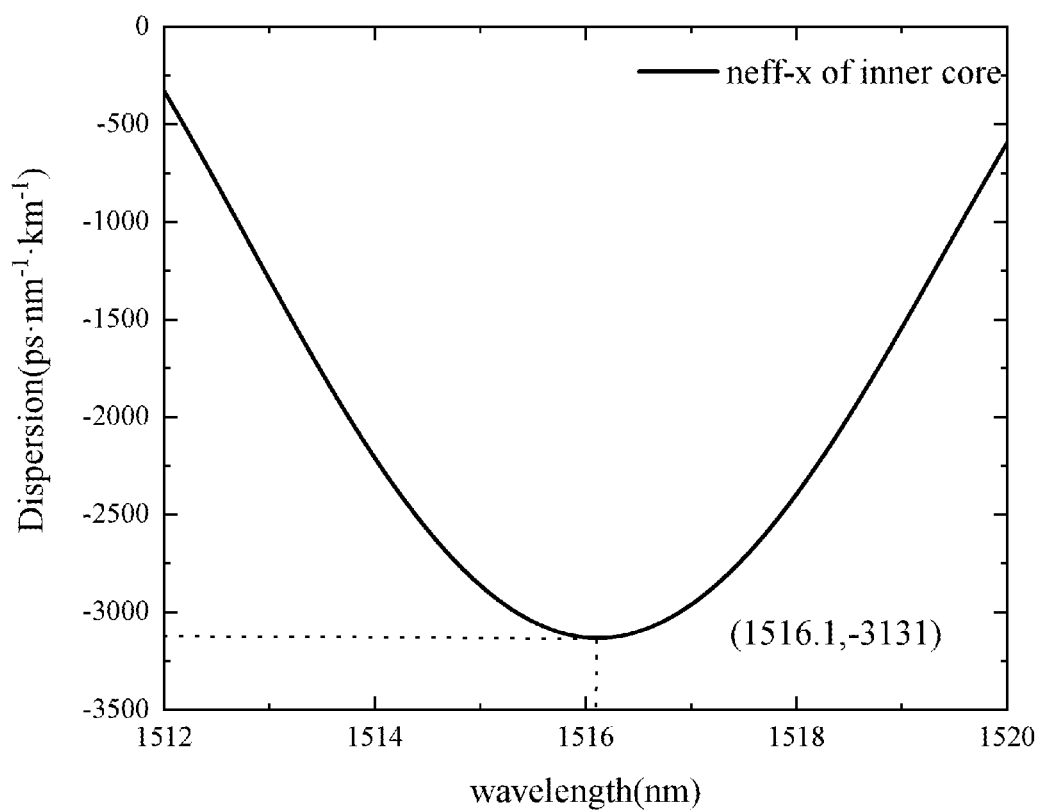
FIG. 4 shows the dispersion curve with wavelength of the inner core x-polarized mode in Example 1.

As shown in FIG. 4, according to the calculation formula of dispersion, if the value of inner-neff-x is concave at the narrow bandwidth where it drops abruptly, the second derivative of the inner-neff-x to the wavelength is positive. On the contrary, the dispersion of the inner core x-polarized mode is negative and has a value of −3131 ps/(nm·km) at 1516.1 nm.

Example 2

In this example, the adjacent air hole spacing Λ is 2.293 μm. The diameter d1 of the air holes is 1.606 μm. The diameter d2 of the air holes is 1.377 μm. The diameter d3 of the air holes is 0.229 μm. The diameter d4 of the air holes is 1.060 μm. The inner cladding air-hole array directly above or below the single-layer air-hole array surrounding the inner core contains 4 row of air holes. The two sub-areas of the air-hole array in area 2, each contains 11 rows and 7 columns of air holes.

Figure 6:
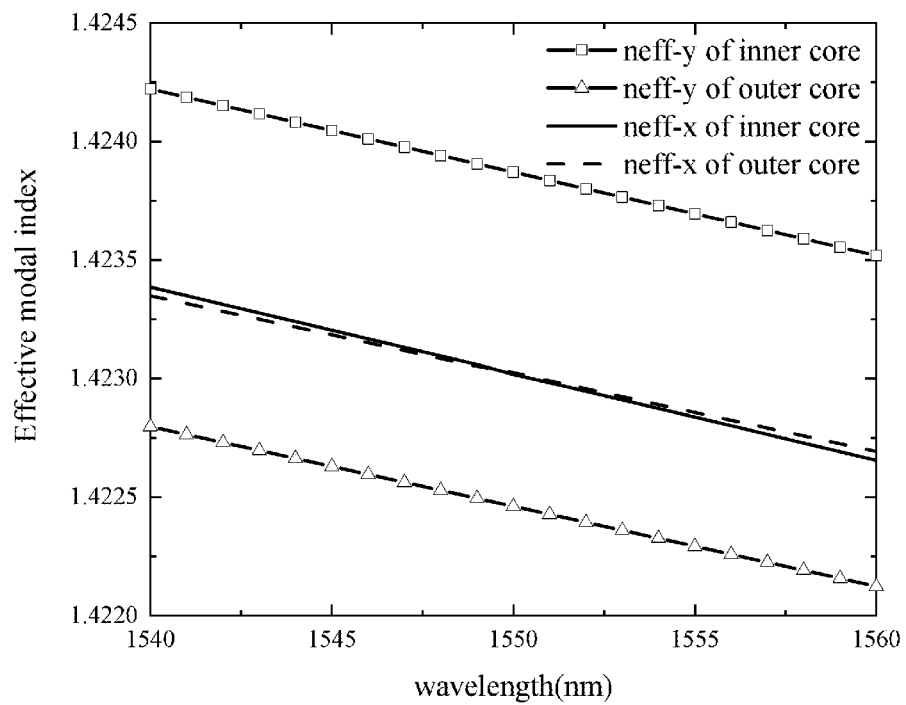
FIG. 6 shows the curves of the refractive indices of the inner and outer core modes with wavelength in Example 2.
Figure 6:
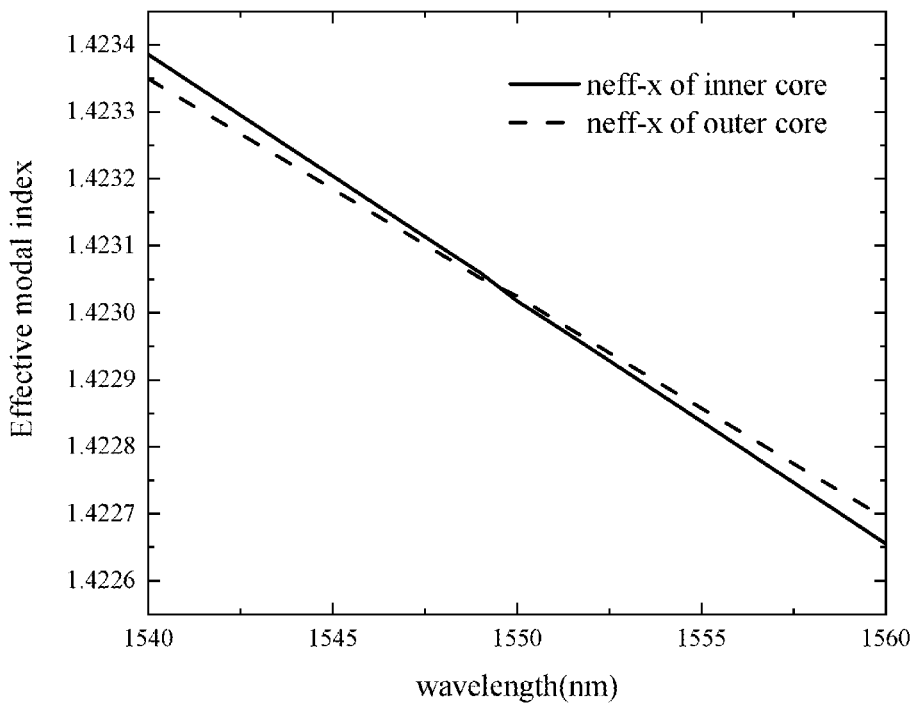

As shown in FIG. 6(a), the inner-neff-y is larger than the inner-neff-x. The birefringence with fast axis along x-direction and slow axis along y-direction is generated in the inner core. The outer-neff-x is larger than the outer-neff-y. The birefringence with slow axis along x-direction and fast axis along y-direction is generated in the outer core. The mismatching of refractive indices between the inner core and the outer core y-polarized mode is achieved.

Figure 7:
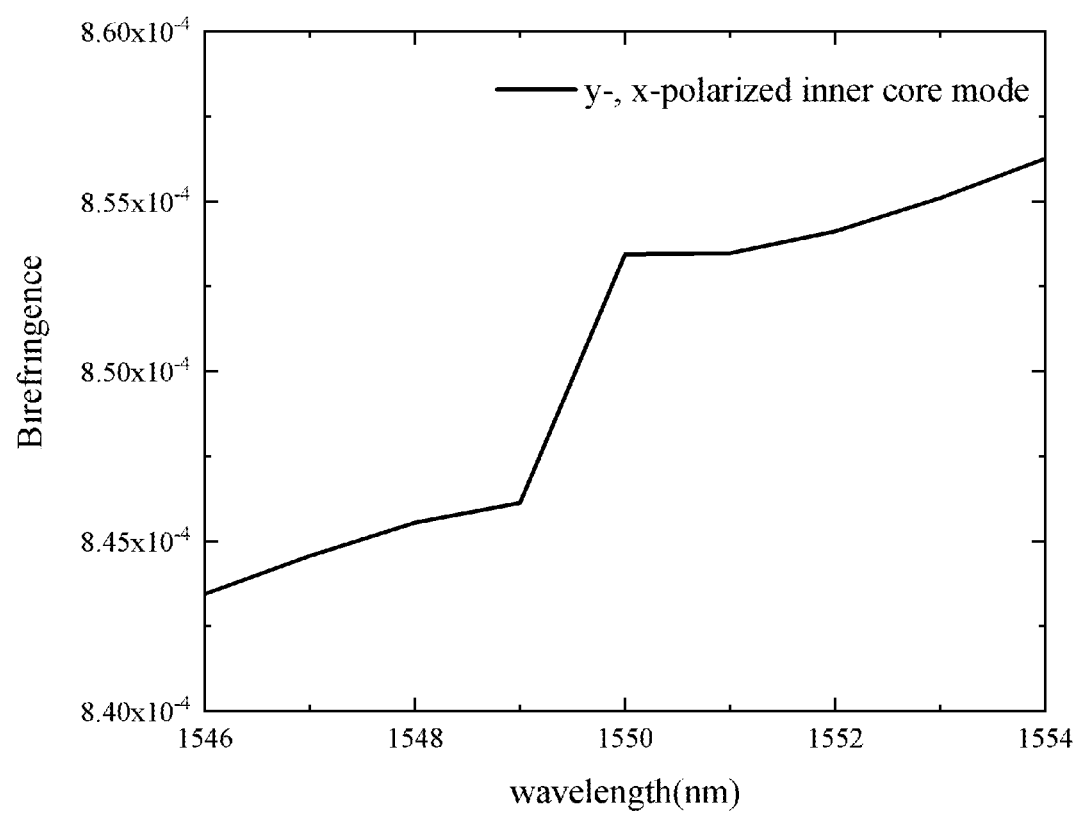
FIG. 7 shows the birefringence curve of the inner core y and x-polarized modes with wavelength in Example 2.

As shown in FIG. 6(b), the two curves approach each other rapidly when the wavelength moves towards the resonant wavelength. This leads to the rapid decrease of the difference between the inner-neff-x and outer-neff-x's value. These two curves separate rapidly when the wavelength moves away from the resonant wavelength. This leads to the rapid increase of the difference between the inner-neff-x and outer-neff-x's value. This further results in the abrupt drop of the value of inner-neff-x in a narrow band and increases this birefringence of the inner and outer core x-polarized mode. As shown in FIG. 7, the birefringence value of the inner core y and x-polarized modes is $8.53 \times 10^{-4}$ at 1550 nm.

Figure 8:
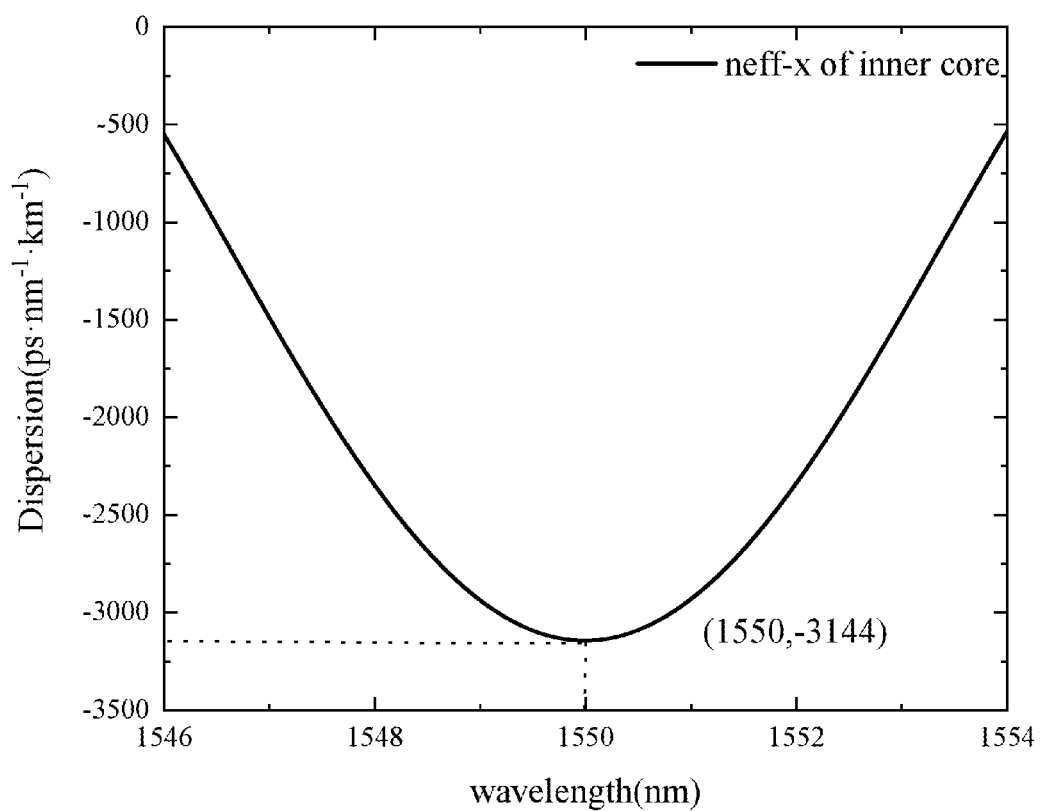
FIG. 8 shows the dispersion curve with wavelength of the inner core x-polarized mode in Example 2.

As shown in FIG. 8, the dispersion of the inner core x-polarized mode is negative and has a value of −3144 ps/(nm·km) at 1550 nm.

Example 3

In this example, the adjacent air hole spacing $\Lambda$ is 2.298 μm. The diameter d1 of the air holes is 1.611 μm. The diameter d2 of the air holes is 1.382 μm. The diameter d3 of the air holes is 0.234 μm. The diameter d4 of the air holes is 1.065 μm. The inner cladding air-hole array directly above or below the single-layer air-hole array surrounding the inner core contains 6 row of air holes. The two sub-areas of the air-hole array in area 2, each contains 15 rows and 8 columns of air holes.

Figure 10:
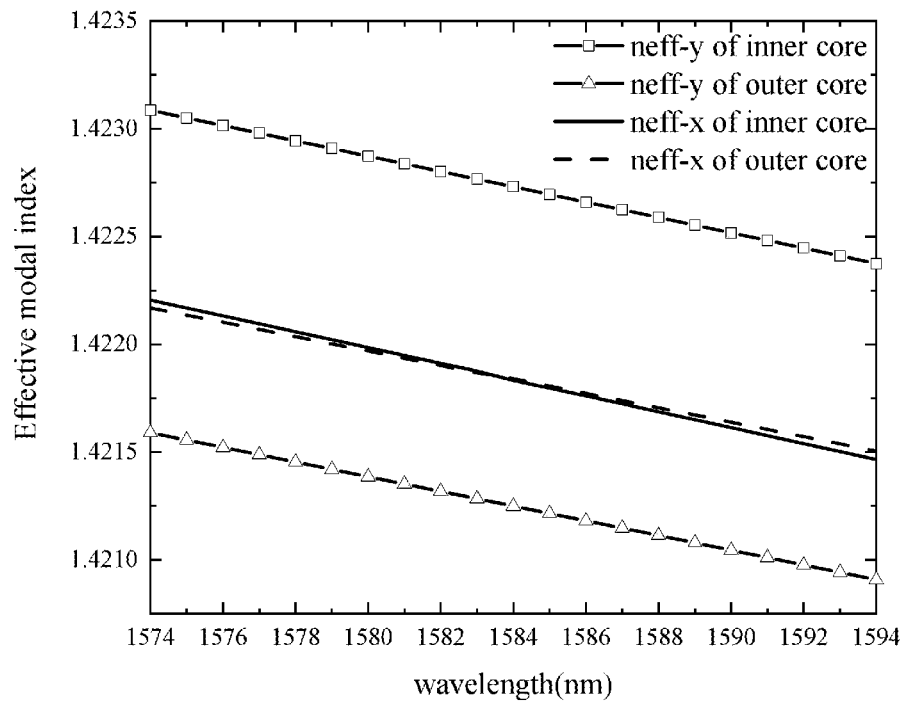
FIG. 10 shows the curves of the refractive indices of the inner and outer core modes with wavelength in Example 3.
Figure 10:
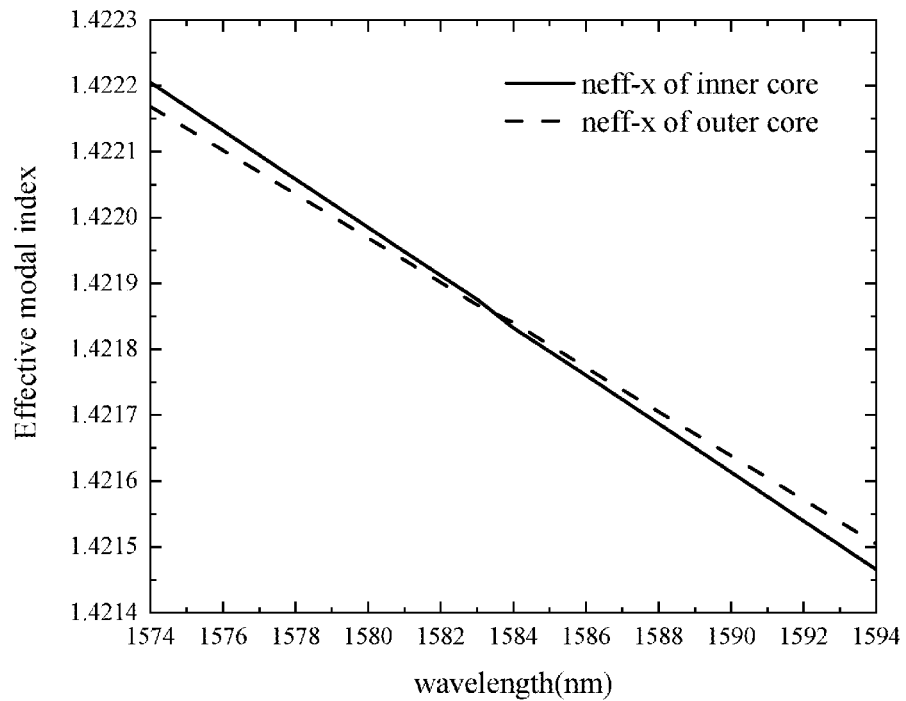

As shown in FIG. 10(a), the inner-neff-y is larger than the inner-neff-x. The birefringence with fast axis along x-direction and slow axis along y-direction is generated in the inner core. The outer-neff-x is larger than the outer-neff-y. The birefringence with slow axis along x-direction and fast axis along y-direction is generated in the outer core. The mismatching of refractive indices between the inner core and the outer core y-polarized mode is achieved.

Figure 11:
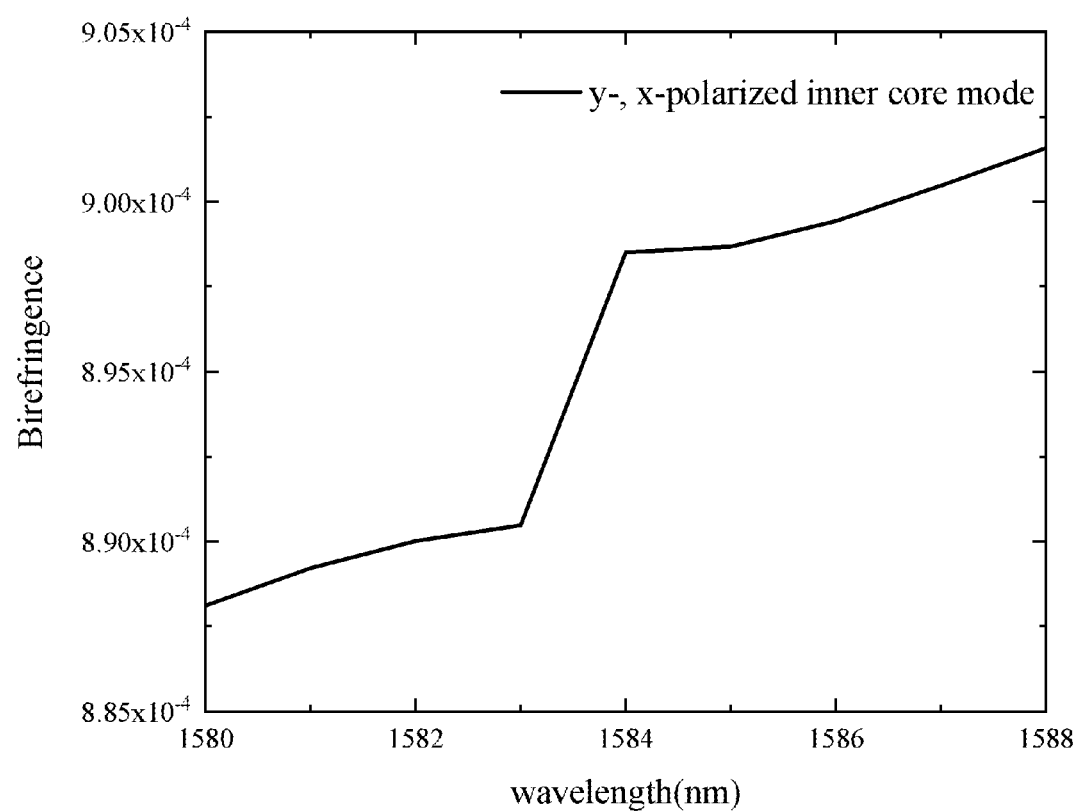
FIG. 11 shows the birefringence curve of the inner core y and x-polarized modes with wavelength in Example 3.

As shown in FIG. 10(b), the two curves approach each other rapidly when the wavelength moves towards the resonant wavelength. This leads to the rapid decrease of the difference between the inner-neff-x and outer-neff-x's value. These two curves separate rapidly when the wavelength moves away from the resonant wavelength. This leads to the rapid increase of the difference between the inner-neff-x and outer-neff-x's value. This further results in the abrupt drop of the value of inner-neff-x in a narrow band and increases this birefringence of the inner and outer core x-polarized mode. As shown in FIG. 11, the birefringence value of the inner core y and x-polarized modes is $8.97 \times 10^{-4}$ at 1583.8 nm.

Figure 12:
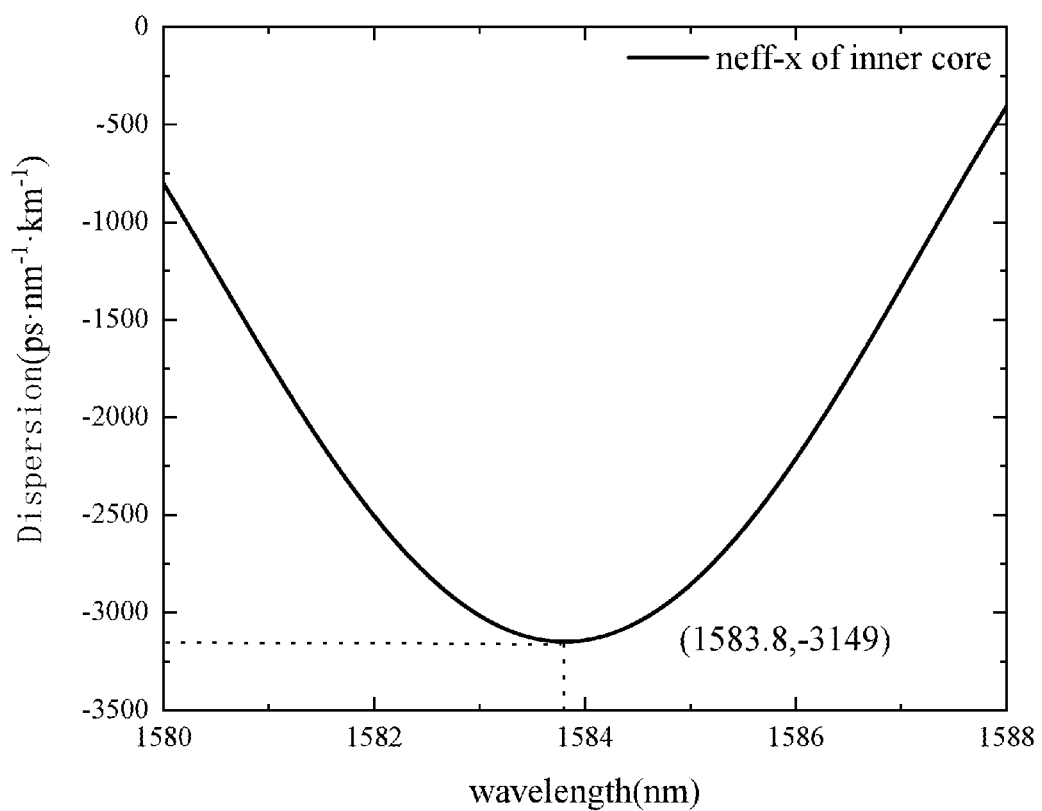
FIG. 12 shows the dispersion curve with wavelength of the inner core x-polarized mode in Example 3.

As shown in FIG. 12, the dispersion of the inner core x-polarized mode is negative and has a value of −3149 ps/(nm·km) at 1583.8 nm.

The above-mentioned embodiments merely describe the preferred embodiments of this invention, and do not limit the scope of this invention. Without departing from the design spirit of this invention, if the practitioners in the field make various deformation and improvement to the technical schemes of this invention, these should fall within the protection scope determined by the claims of this invention.

We claim:

1. A polarization-maintaining dispersion-compensation microstructure fiber, wherein pure silica glass is used as a base material; the fiber comprises an inner core, a single-layer air-hole array surrounding the inner core, an inner cladding air-hole array, an air-hole array in an outer core, a single-layer air-hole array surrounding the outer core, and an outer cladding air-hole array; the single-layer air-hole array surrounding the inner core and the inner cladding air-hole array are collectively referred to an air-hole array in a first area; the air-hole array in the outer core, the single-layer air-hole array surrounding the outer core, and the air-hole array in the outer core are collectively referred to an air-hole array in a second area;

the air-hole array in the first area includes 3 rows of air holes arranged in a square lattice arrangement with an adjacent air hole spacing $\Lambda$; in the first area, two air holes in a middle row are omitted to form the inner core; a midpoint of a line connecting centers of the two omitted air holes are defined as a coordinate original point; an axis connecting the centers of the two omitted air holes is defined as y-axis; an axis passing through the original point and perpendicular to the y-axis is defined as the x-axis; a diameter of the air holes in the single-layer air-hole array surrounding the inner core is d1; the air holes in the air-hole array in the second area are arranged in square lattice arrangement with the adjacent air hole spacing $\Lambda$; the second area contains two sub-areas that are located outside the first area in the x-direction; the air-hole arrays in the first and second areas are separated by $\Lambda$ along x-direction, and dislocated by $\Lambda/2$ along y-direction; two outer cores are respectively located in the two sub-areas of the second area and are symmetrically distributed with respect to the y-axis; the two outer cores have an identical structure; each of the two outer cores contains the air-hole array in the outer core and each air-hole array in the outer core comprises two air holes with a diameter d3; four air holes with the diameter d3 are located on a positive x-axis and a negative x-axis respectively, with distances of $3\Lambda$ and $4\Lambda$ measured from the centers of the air holes to the original point, respectively; a diameter of the air holes in the single-layer air-hole array surrounding the outer core is d2; a diameter of the air holes in the inner cladding air-hole array and the outer cladding air-hole array are both d4; the four diameters satisfy the relationship of d1>d2>d4>d3.

2. The fiber according to claim 1, wherein the air holes in the air-hole array in the first area and the air-hole array in the second area use the adjacent air hole spacing $\Lambda$ in a range of 2.288-2.298 μm.

3. The fiber according to claim 1, wherein the diameter d1 of the air holes in the single-layer air-hole array surrounding the inner core is in a range of 1.601-1.611 μm.

4. The fiber according to claim 1, wherein the diameter d3 of the two air holes included in the air-hole array in the outer core is in a range of 0.224-0.234 μm.

5. The fiber according to claim 1, wherein the diameter d2 of the air holes in the single-layer air-hole array surrounding the outer core is in a range of 1.372-1.382 μm.

6. The fiber according to claim 1, wherein the diameter d4 of the air holes in the inner cladding and the outer cladding air-hole arrays is in a range of 1.055-1.065 μm.

7. The fiber according to claim 1, wherein the inner cladding air-hole array directly above or below the single-layer air-hole array surrounding the inner core contains more than 1 row of air holes; and the two sub-areas of the air-hole array in the second area contains more than 5 rows and 5 columns of air holes.

\* \* \* \* \*